United States Patent
Kuraoka

(10) Patent No.: US 8,913,471 B2
(45) Date of Patent: Dec. 16, 2014

(54) RECORDING APPARATUS AND RECORDING METHOD FOR A MULTILAYER RECORDING MEDIUM

(71) Applicant: Sony Corporation, Tokyo (JP)

(72) Inventor: Tomotaka Kuraoka, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/921,799

(22) Filed: Jun. 19, 2013

(65) Prior Publication Data

US 2014/0003210 A1  Jan. 2, 2014

(30) Foreign Application Priority Data

Jun. 28, 2012  (JP) .................................. 2012-144867

(51) Int. Cl.
*G11B 11/00*  (2006.01)

(52) U.S. Cl.
USPC ........................................................ 369/53.2

(58) Field of Classification Search
None
See application file for complete search history.

(56) References Cited

U.S. PATENT DOCUMENTS

| | | | | |
|---|---|---|---|---|
| 6,633,535 B1* | 10/2003 | Asada | ........................... | 369/286 |
| 7,924,695 B2* | 4/2011 | Shoji et al. | ................. | 369/275.3 |
| 2007/0025210 A1* | 2/2007 | Kishigami et al. | ......... | 369/47.53 |
| 2007/0165492 A1* | 7/2007 | Yamanaka | ................. | 369/13.01 |
| 2011/0242948 A1* | 10/2011 | Suzuki et al. | .............. | 369/30.03 |

FOREIGN PATENT DOCUMENTS

JP  2009-123331 A  6/2009

OTHER PUBLICATIONS

Osta.Org "Universal Disk Format Specification" Revision 2.50, Apr. 30, 2003, 165 pages.

* cited by examiner

*Primary Examiner* — Paul Huber
(74) *Attorney, Agent, or Firm* — Sony Corporation

(57) ABSTRACT

A recording apparatus includes: a recording unit configured to perform recording of information on a recoding medium having a plurality of layers serving as recording layers where recording of information is performed, and a track serving as a continuous recording area is formed in the plurality of layers and recording of data is performed within a track; and a control unit configured to cause the recording unit to execute recording to the recording medium according to a request from a host apparatus, and also to enable the host apparatus to recognize, in the event of determining that a certain layer of the recording medium is in a recording disabled state, that all of tracks in this layer are in a recording disabled state.

17 Claims, 21 Drawing Sheets

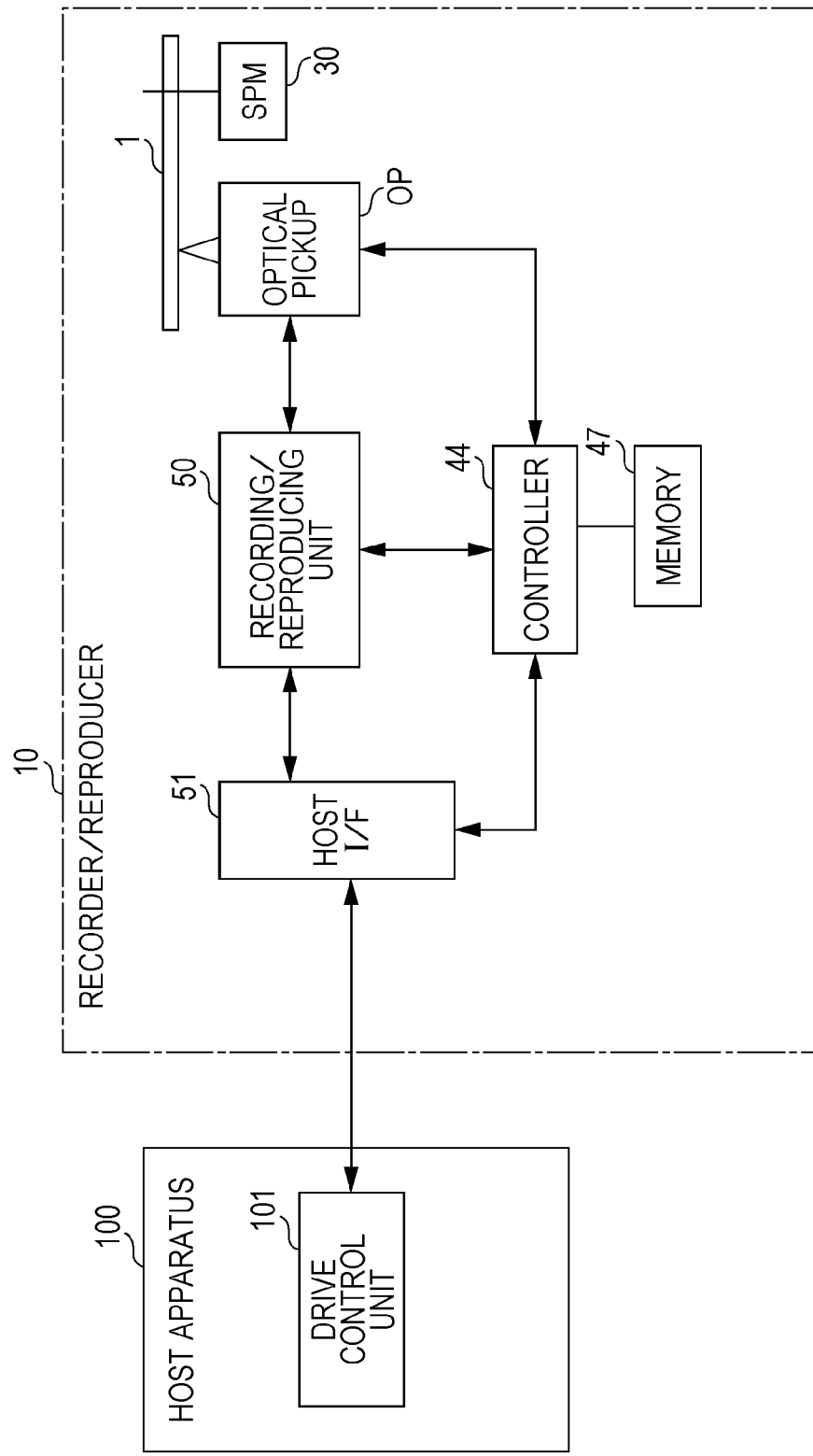

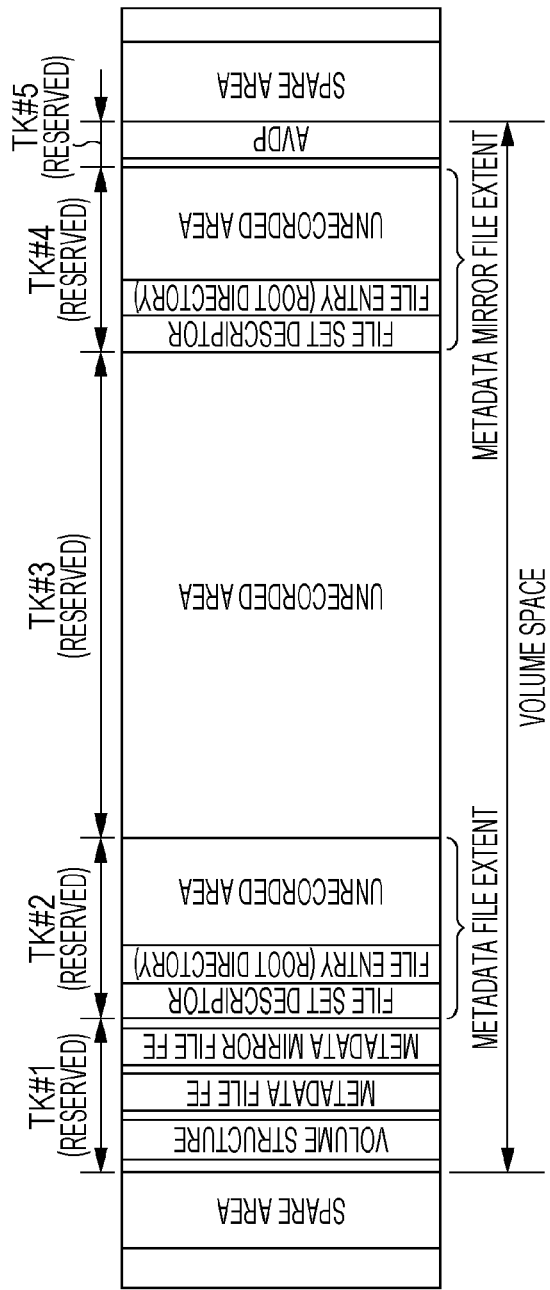
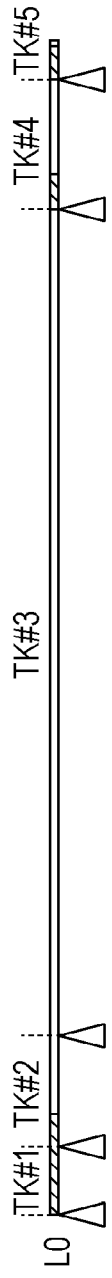
FIG. 7A
FIG. 7B

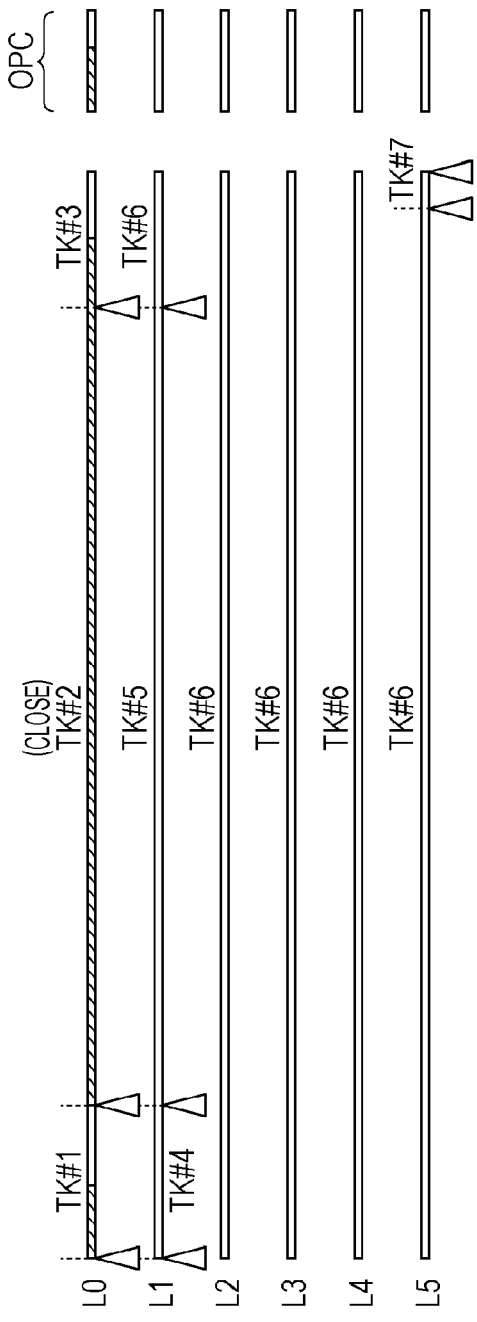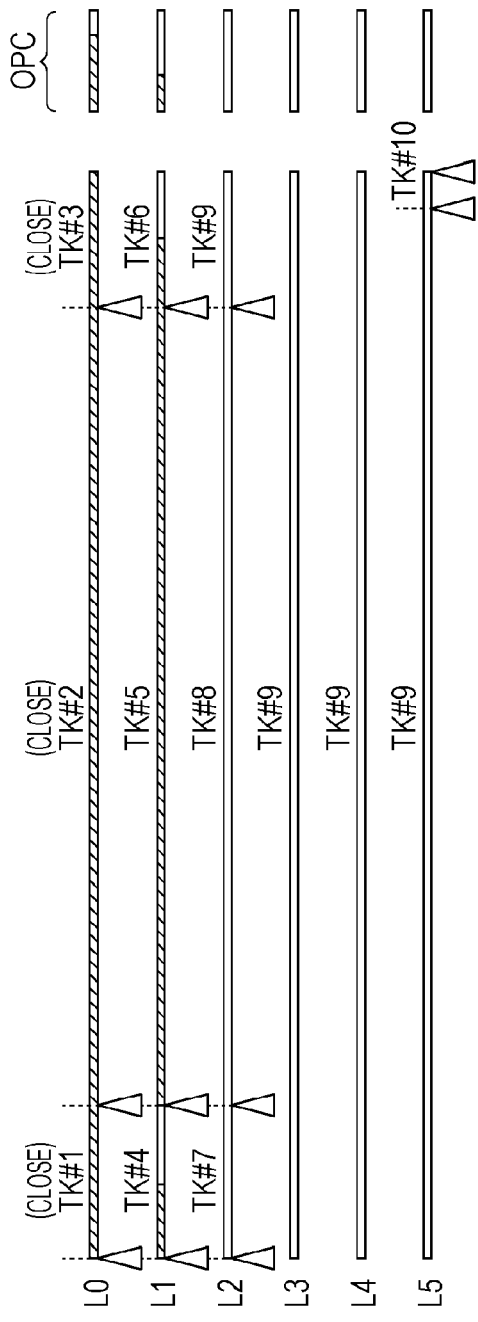

RECORDING APPARATUS AND RECORDING METHOD FOR A MULTILAYER RECORDING MEDIUM

BACKGROUND

The present disclosure relates to a recording apparatus and a recording method for a multilayer recording medium where multiple layers serving as recording layers are provided.

Examples of the related art of the present disclosure include Japanese Unexamined Patent Application Publication No. 2009-123331.

So-called optical disc recording media (hereinafter, also simply referred to as optical disc), such as CD (Compact Disc), DVD (Digital Versatile Disc), BD (Blu-ray Disc (registered trademark)) and so forth, for example, have come into widespread use as optical recording media where recording or playing of signals is performed by irradiation of light.

Heretofore, with regard to optical discs, large recording capacity has been achieved by realizing improvement in information recording density thereof. Specifically, there have been employed a technique for improving recording density in a direction where a formation pitch of tracks serving as pit rows or mark rows is narrowed, that is, in a radial direction, and a technique for improving recording density in a linear direction (direction orthogonal to a radial direction) by reduction in size of pits or marks. On the other hand, when realizing large recording capacity, a technique for increasing the number of recording layers (layers) is also effective, and multilayer discs such as 2-layer discs or 3 or more layer discs have been proposed and put into practical use under present circumstances.

SUMMARY

Incidentally, in the case of a multilayer disc, a layer disposed in the back as viewed from the laser entry face side is influenced by the recorded state of a layer on the front side. That is to say, at the time of recording in a certain layer, it is not desirable that a layer on the front side where a laser beam passes through has been recorded. In the event that a layer on the front side has been recorded, suitable recording as to an area of a layer to the back side that is overlapped by a recorded area of a layer to the front side may not be executed, depending on disc types. Also, with multilayer discs, there is also demand for effectively managing tracks (continuous recording areas) where user data and management information are recorded, and also improving reliability and operation performance. Further, there is also demand for performing recording operation effectively using areas. Particularly, with a multiplayer disc, in the event that a certain layer becomes recording disabled for some reason, it is desirable that other layers are able to be effectively used.

Therefore, with the present disclosure, there will be proposed a technique for effectively using capacity while maintaining reliability regarding recording operation for a multilayer recording medium.

A recording apparatus according to the present disclosure includes: a recording unit configured to perform recording of information on a recoding medium having a plurality of layers serving as recording layers where recording of information is performed, and a track serving as a continuous recording area is formed in the plurality of layers and recording of data is performed within a track; and a control unit configured to cause the recording unit to execute recording to the recording medium according to a request from a host apparatus, and also to enable the host apparatus to recognize, in the event of determining that a certain layer of the recording medium is in a recording disabled state, that all of tracks in this layer are in a recording disabled state.

A recording method according to the present disclosure includes: performing recording of information on a recoding medium having a plurality of layers serving as recording layers where recording of information is performed, and a track serving as a continuous recording area is formed in the plurality of layers and recording of data is performed within a track, in response to a request from a host apparatus; and enabling the host apparatus to recognize, in the event of determining that a certain layer of the recording medium is in a recording disabled state, that all of tracks in this layer are in a recording disabled state.

With such a present disclosure, at the time of a certain layer being placed in a recording disabled state, a recording apparatus performs track management so that each track in the layer thereof is placed in a recording disabled state as viewed from a host apparatus. In the event of having recognized that this layer is hereinafter in a recording disabled state, the host apparatus enables to perform processing for using another layer, for example, processing for setting a track in another layer to request recording, or the like.

A layer having determined to be in a recoding disabled state is not allowed to execute subsequent recording, thereby securing reliability of recording operation. Also, a recording disabled state is set in increments of layers instead of the entire multilayer recording medium, and accordingly, subsequent use of another layer is not disturbed.

According to the present disclosure, there is an advantage wherein capacity may effectively be used while maintaining reliability as recording operation with a multilayer recording medium as a target.

BRIEF DESCRIPTION OF THE DRAWINGS

FIG. 4 is a schematic block diagram of a host apparatus and a recorder/reproducer, according to an embodiment;

FIGS. 7A and 7B are explanatory diagrams of a file system (single layer) serving as a comparative example;

FIGS. 10A and 10B are explanatory diagrams of track setting according to an embodiment;

DETAILED DESCRIPTION OF EMBODIMENT

Hereinafter, an embodiment will be described in the following sequence.
1. Recording Medium
2. Location Control Technique Using Reference Plane
3. Host Apparatus and Recorder/Reproducer
4. Track Management According to Embodiment
4-1. File System and Track Management
4-2. Format (Initial Track Setting)
4-3. Recording/Closing Track/Track Setting of Next Layer
4-4. Track Management in Increments of Layers Using Recorder/reproducer
4-5. Track Management Example Using Recorder/reproducer
5. Modifications 1. Recording Medium First, description will be made regarding a recording medium which a recorder/reproducer according to an embodiment of the present disclosure takes as an object of recording operation. Note that a multilayer recording medium (multilayer optical disc) which will be described below is just an example of a recording medium to be used for an embodiment. A configuration and mode of a recording layer or the like may also variably be conceived.

Figure 1:
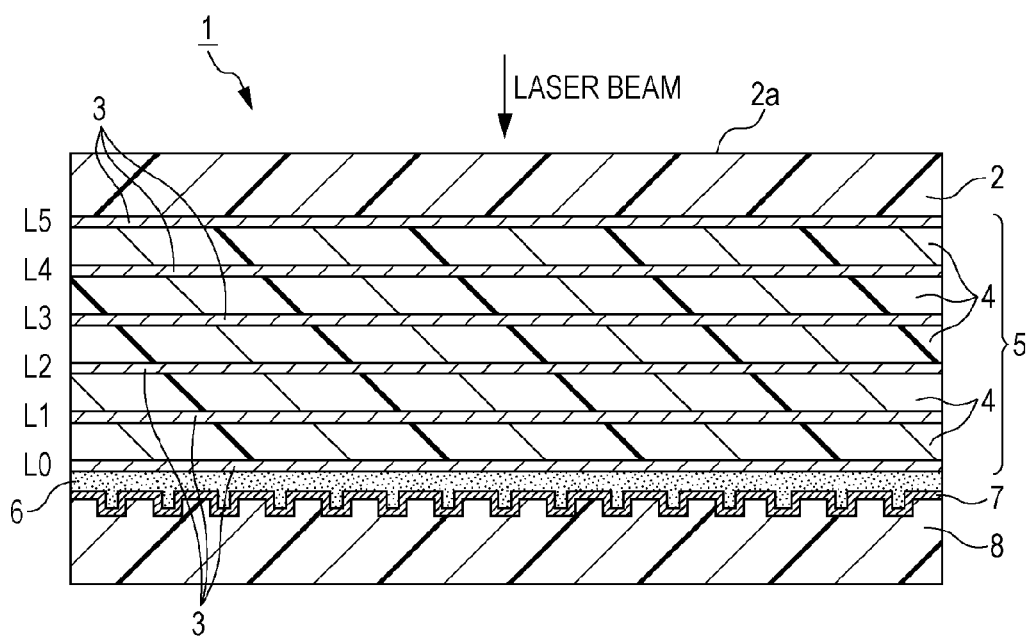
FIG. 1 is an explanatory diagram of a layer configuration of an optical disc to be used for an embodiment of the present disclosure.

FIG. 1 illustrates a cross-sectional configuration of a multilayer recording medium 1. This multilayer recording medium 1 is realized as an optical disc with the same diameter of 12 cm and the same thickness of 1.2 mm as with CD, DVD, and BD, for example. FIG. 1 schematically illustrates a cross-sectional configuration in the thick direction. As illustrated in FIG. 1, with the multilayer recording medium 1, there are formed a cover layer 2, a recording layer formation area 5 where multiple recording layers 3 are formed, an adhesion layer 6, a reflection film 7, and a substrate 8 in order from the upper layer side in FIG. 1. Here, a face where a laser beam from a later-described recorder/reproducer 10 side is input is the cover layer 2 side. A laser entry face 2a is the face of the cover layer 2. With the following description, the laser entry face 2a side will also be referred to as "front side", and the substrate 8 side will also be referred to as "rear side" with the laser entry direction as a reference.

With the multilayer recording medium 1, the cover layer 2 is configured of, for example, a resin, and serves as a protection layer of the recording layer formation area 5 formed on the rear side thereof.

The recording layer formation area 5 is configured so as to include multiple recording layers 3, and intermediate layers 4 inserted therebetween, as illustrated in FIG. 1. That is to say, the recording layer formation area 5 in this case is formed by layering repeatedly being performed such as recording layer 3→intermediate layer 4→recording layer 3→intermediate layer 4 . . . →recording layer 3. The recording layers 3 are configured of a semitransparent recording film. The intermediate layers 4 are configured of a resin material, for example, such as a heat-reversibility resin, ultraviolet curing resin, or the like.

In this drawing, though six recording layers 3 are formed within the recording layer formation area 5, this is consistently an example, and the number of recording layers may be set to other than "6". The recording layers 3 are referred to as layers L0, L1, L2, and so on in order from the rear side as viewed from the laser entry face 2a. This example has a 6-layer configuration, and accordingly, the layers L0 to L5 are formed as the recording layers 3.

With this example, with the recording layer formation area 5, no location guider (uneven pattern) in accordance with formation of a groove or pit row or the like is formed in each of the recording layers 3. That is to say, the recording layers 3 are formed in a planar shape. At the time of creation of such a recording layer formation area 5, a process for forming a location guider for each recording layer which is used for manufacturing of the current multilayer disc may be eliminated, and consequently, manufacturing cost and volume production of the multilayer recording medium 1 may effectively be reduced. The recording layers 3 have a planar shape, which means that address information and so forth according to the uneven patterns are not formed beforehand. At the time of recording of information, that is, at the time of recording of user data or management information which is principal information, the address information is recorded in accordance with recording of the principal information thereof. That is to say, the address information is embedded in the principal data (principal data for the purpose of recording such as user data or management information), and is encoded, and the encoded recorded data thereof is recorded.

A recording mark row is formed in the recording layers 3 in accordance with a recording operation. Note that the recording mark row mentioned here is a so-called "track" to be formed on an optical disc in a spiral shape. With the field of optical discs, in general, "track" is used for meaning an area unit to be continuously recorded (e.g., music unit in CD), and also used for meaning a mark row, a pit row, a group, which are formed with a circumferential configuration, or the like. "track" where track setting or close processing is performed with claims or a later-described embodiment of the present disclosure means increments of areas to continuously be recorded. In order to clarify description, the term of "track" will not be used for a mark row or the like to be formed with a circumferential configuration, and in stead of this, "recording mark row" will be used.

Figure 2A:
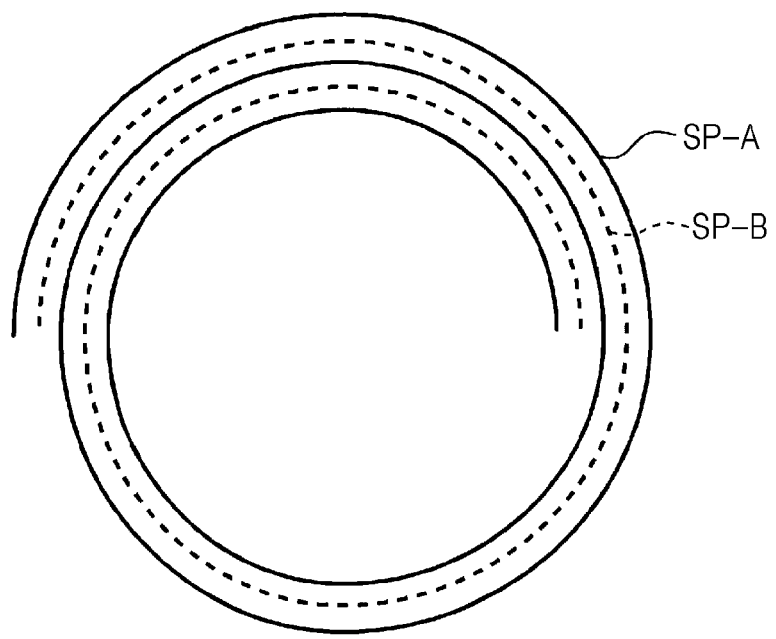
FIGS. 2A and 2B are explanatory diagrams of a track configuration of an optical disc to be used for an embodiment.
Figure 2B:
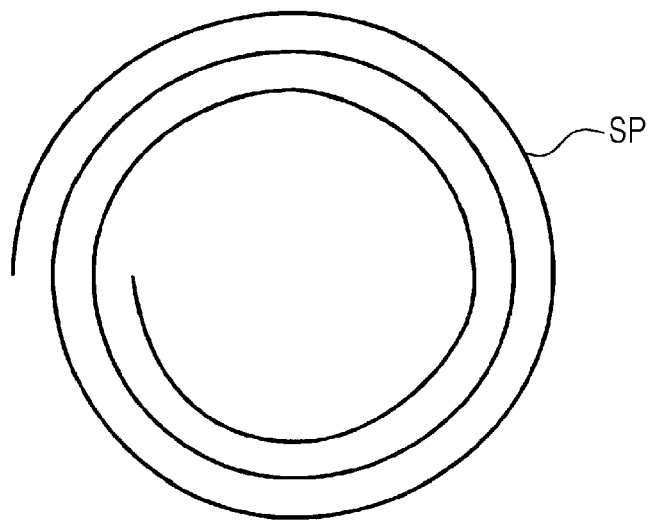

As examples of the recording mark row, an example formed in a double spiral shape as illustrated in FIG. 2A, and an example formed in a single spiral shape as illustrated in FIG. 2B may be conceived. The recording mark row in a single spiral shape is the same as with CD, DVD, or the like according to the related art. With the recording mark row in a double spiral shape, as illustrated with a solid line and a dashed line in FIG. 2A, two spirals SP-A and SP-B are formed. The configuration of the recording mark row in a double spiral shape may be realized by a method for forming a spiral using two recording beams at the same time, or may be realized by a method for forming the first spiral SP-A with a certain pitch using one recording beam, and then forming the second spiral SP-B between the recording mark rows thereof. Note that an example of a double spiral is illustrated here, but there may be conceived a configuration of a recording mark row of which the spiral is further multiplexed such as a triple spiral, a fourfold spiral, or the like.

As illustrated in FIG. 1, a reflection film 7 is formed further to the rear side from the recording layer formation area 5 via an adhesion layer (intermediate layer) 6 configured of a predetermined adhesive material. With this reflection film 7, a location guider for guiding a recording/playing position is formed. Note that a location guider is formed in the reflection film, which means that the reflection film is formed on an interface where a location guider is formed.

Specifically, in this case, a location guider is formed on one face side of the substrate 8 in FIG. 1, and accordingly, an uneven cross-sectional shape is given as illustrated in FIG. 1, and the reflection film 7 is formed on the face where this uneven cross-sectional shape of the substrate 8 is given, whereby a location guider is formed on this reflection film 7. Note that the substrate 8 is configured of a resin such as polycarbonate or the like. This substrate 8 may be generated by injection molding using stamper for providing an uneven cross-sectional shape serving as the location guider, for example.

Here, as performed by the present recordable optical disc, address information that represents an absolute position in a direction parallel to the inner direction of the recording face of the multilayer recording medium 1 may be recorded by formation of the location guider. For example, in the event that the location guider is formed of a groove, this absolute position information may be recorded by modulation of the meandering (wobbling) cycle of this groove, and in the event that the location guider is formed of a pit row, the absolute position information may be recorded by modulation of pit length or formation interval.

Note that no location guider is formed for the recording layers 3 as described above, and control of a recording position on the recording layers 3 is performed based on reflected light from the reflection film 7 where the location guider is formed as will be described below. In this meaning, hereinafter, the reflection film 7 (reflection surface) where the location guider is formed will be referred to as "reference plane Ref". Also, address information recorded in the reference plane Ref in an uneven pattern will be referred to as "reference plane address" in meaning for being distinguished from an address to be recorded in a recording layer 3. Also, an address to be recorded in a recording layer 3 along with principal information will be referred to as "recording layer address".

No location guider is formed in the recording layers 3, and accordingly, there may be manufactured a multilayer recording medium which does not lead to increase in cost as described above. However, in this case, in order to suitably access a recording layer 3 where no address exists, the reference plane Ref is provided in a state layered on the recording layer 3. With the reference plane Ref, addresses are formed in an uneven pattern such as a wobbling groove or pit row or the like beforehand. Thus, access to a desired position on the multilayer recording medium 1 may be performed depending on an address of the reference plane Ref, and recording or reproducing of information (user data and management data) may be performed on a recording layer 3 in the position thereof.

Note that the description so far has been made regarding an example of the multilayer recording medium 1 with a recording layer 3 formed in a planar shape, and the following description will be made regarding an example using such a multilayer recording medium 1, but there may also be a configuration of the multilayer recording medium 1 wherein addresses are formed on a recording layer 3 of the multilayer recording medium 1 by uneven patterns such as wobbling grooves or pit rows or the like. Track management operation serving as a later-described embodiment of the present disclosure may also be applied to a multilayer recording medium in a mode wherein uneven patterns such as wobbling grooves and pit rows are formed on a recording layer 3.

2. Location Control Technique Using Reference Plane

Figure 3A:
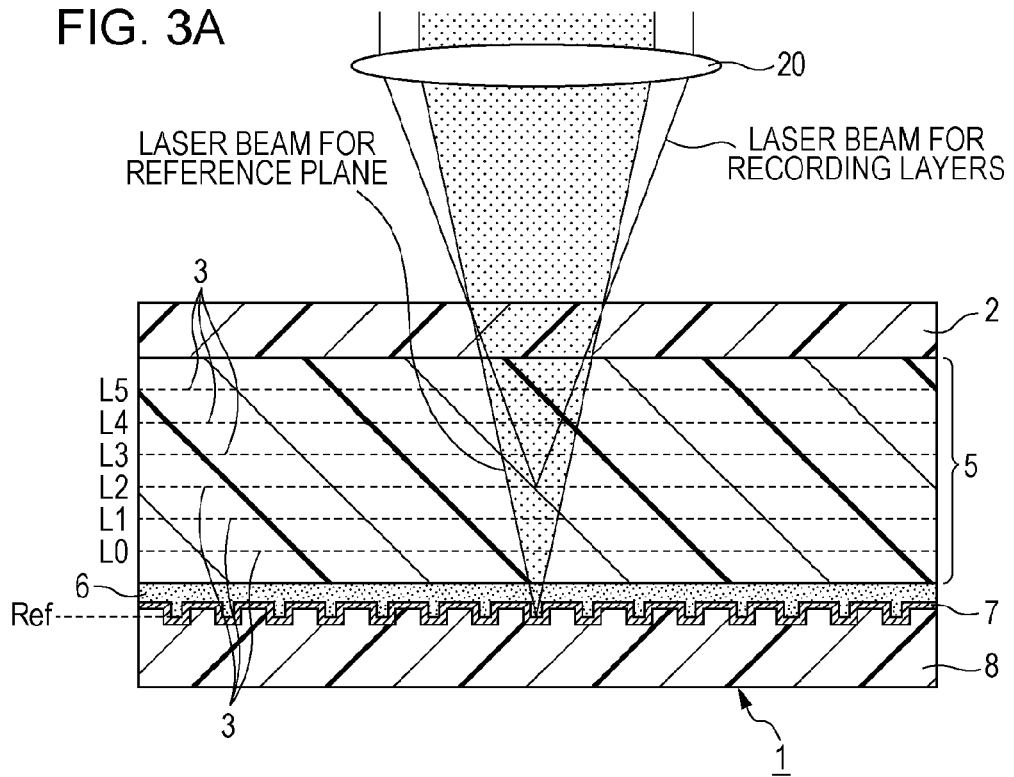
FIGS. 3A and 3B are explanatory diagrams of servo operation to an optical disc to be used for an embodiment.
Figure 3B:
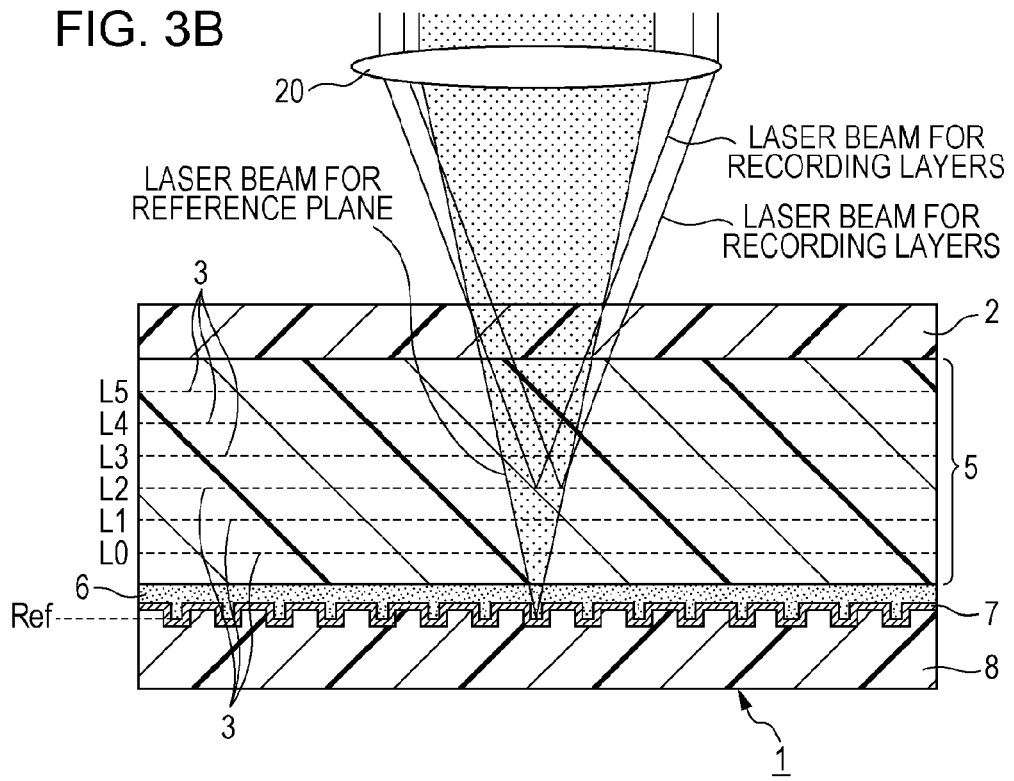

FIGS. 3A and 3B are explanatory diagrams regarding a location control technique with the location guider formed on the reference plane Ref being used. In order to realize location control regarding a laser beam for recording layers to be irradiated on a recording layer 3, a laser beam for performing location control based on the location guider on the reference plane Ref (hereinafter, referred to as laser beam for reference plane) is irradiated on the multilayer recording medium 1 according to the above-mentioned configuration, along with the laser beam for recording layers. Specifically, these laser beam for recording layers and laser beam for reference plane are irradiated on the multilayer recording medium 1 via a common objective lens 20 as illustrated in FIG. 3A. At this time, in order to realize accurate tracking servo, the optical axes of the laser beam for recording layers and laser beam for reference plane are configured so as to agree.

At the time of recording of a mark on a recording layer 3 (desired semitransparent recording film), the laser beam for reference plane is irradiated so as to be focused on the reflection surface (reference plane Ref) of the reflection film 7 as illustrated in FIG. 3A, and location control of the objective lens 20 is performed in accordance with a tracking error signal to be obtained based on the reflected beam thereof. That is to say, tracking servo is applied thereto. Thus, a location in a tracking direction of the laser beam for recording layers to be irradiated via the same objective lens 20 may be controlled to a desired location.

On the other hand, location control at the time of reproducing may be realized as follows. At the time of reproducing, a mark row (i.e., recorded track) is formed on a recording layer 3, and accordingly, tracking servo may be applied to this mark row with the laser beam for recording layers itself. That is to say, tracking servo at the time of reproducing may be realized by performing location control of the objective lens 20 in accordance with a tracking error signal to be obtained based on a reflected beam of the laser beam for recording layers.

Here, with the location control technique as described above, in the event that a beam having the same wavelength band as with the laser beam for recording layers is employed as the laser beam for reference plane, there is no other choice than that a reflection ratio regarding the laser beam for recording layers has to be increased regarding the reference plane Ref where the reflected beam of the laser beam for reference plane has to be obtained. That is to say, there is concern that stray light components increase accordingly, which markedly worsens reproducing performance. Therefore, let us assume that a beam of which the wavelength band differs from the laser beam for reference plane and laser beam for recording layers is used, and a reflection film having wavelength selectivity is used as the reflection film 7 where the reference plane Ref is formed. Specifically, in the case of the present example, the wavelength of the laser beam for recording layers is taken as the same approximate 405 nm as with a case of BD, and the wavelength of the laser beam for reference plane is taken as the same approximate 650 nm as with the case of DVD. As the reflection film 7, there is employed a wavelength selectivity reflection film which selectively reflects a beam having the same wavelength band as with the laser beam for reference plane, and transmits or absorbs a beam according to wavelength other than that. According to such a configuration, unnecessary reflected light components of the laser beam for recording layers may be prevented from being generated from the reference plane Ref, and a suitable S/N (signal-to-noise ratio) may be secured.

FIG. 3B is an example wherein two laser beams are irradiated as the laser beams for recording layers. Cases where two laser beams for recording layers are irradiated include a case where recording mark rows having a double spiral shape are recorded or reproduced at the same time, a case where regardless of a double spiral and a single spiral, adjacent track servo (ATS) is employed wherein recording of an adjacent recording mark row is performed along a recording mark row already recorded in a recording layer 3, and so forth.

Briefly speaking, with the ATS, one of the two laser beams for recording layers is taken as a spot for recording, and the other is taken as a spot for servo. Next, while the spot for servo is irradiated on a recording mark row already recorded (e.g., at the time of one round ahead) to perform tracking servo, a recording mark row adjacent to the recording mark row irradiated by this spot for servo is recorded using the spot for recording. In the event of the ATS, tracking servo with the reference plane Ref may not necessarily be performed during recording. However, tracking and address reading with the reference plane Ref is necessary for seek to a recording start location. Also, though detailed description will be avoided, in reality, during execution of the ATS, servo control frequently is inaccurate due to accumulation of error components. Therefore, correction of servo operation may also be performed with information of the reference plane Ref during execution of the ATS. Accordingly, the reference plane Ref is also employed for tracking control even at the time of recording in the event of employing the ATS method.

3. Host Apparatus and Recorder/Reproducer

Next, description will be made regarding the configurations of the host apparatus 100 and recorder/reproducer 10 which make up a recording system according to an embodiment, with reference to FIGS. 4 through 6. The recorder/reproducer 10 has a reproducing function along with a recording function for an optical disc serving as the multilayer recording medium 1. FIG. 4 illustrates a schematic configuration of the host apparatus 100 and recorder/reproducer 10.

The host apparatus 100 issue various commands to the recorder/reproducer 10, and causes the recorder/reproducer 10 to execute recording/reproducing to the multilayer recording medium 1 by the recorder/reproducer 10. The host apparatus 100 and recorder/reproducer 10 have a relation, for example, such as a host computer device and a disk drive device, and may be separate devices, or may be an integral device. For example, the host apparatus 100 serving as a computer device causes the recorder/reproducer 10 to execute recording or reproducing according to a request from application software or OS (Operating System). Here, a portion which controls the recorder/reproducer 10 is illustrated as a drive control unit 101. The drive control unit 101 performs, for example, file system management conforming to a UDF (Universal Disk Format) as a file system to be constructed in the multilayer recording medium 1, executes track setting and closing track processing for this purpose, and instructs the recorder/reproducer 10 to reflect a management state on the multilayer recording medium 1.

This FIG. 4 illustrates, as the configuration of the recorder/reproducer 10, a controller 44, an optical pickup OP, a spindle motor 30, a recording/reproducing processing unit 30, a host interface 51, and memory 47. The host interface 51 of the recorder/reproducer 10 performs communication with the host apparatus 100. For example, the host interface 51 receives various commands and recorded data from the host apparatus, and also transmits data reproduced from the multilayer recording medium 1 to the host apparatus 100. The controller 44 controls the units so that recording, reproducing, format processing, or the like is executed for the multilayer recording medium 1 according to various commands to be supplied from the host apparatus 100 via the host interface 51.

Laser irradiation by the optical pickup OP is performed on the multilayer recording medium 1 while the multilayer recording medium 1 is rotated by the spindle motor 30, and recording or reproducing of information is performed. The recording/reproducing unit 50 performs signal processing or servo operation for recording or reproducing. The memory 47 is used for storing a work area and various parameters that the controller 44 uses. Hereinafter, description will be made in detail regarding a configuration example of the optical pickup OP and recorder/reproducer 10 with reference to FIGS. 5 and 6.

Figure 5:
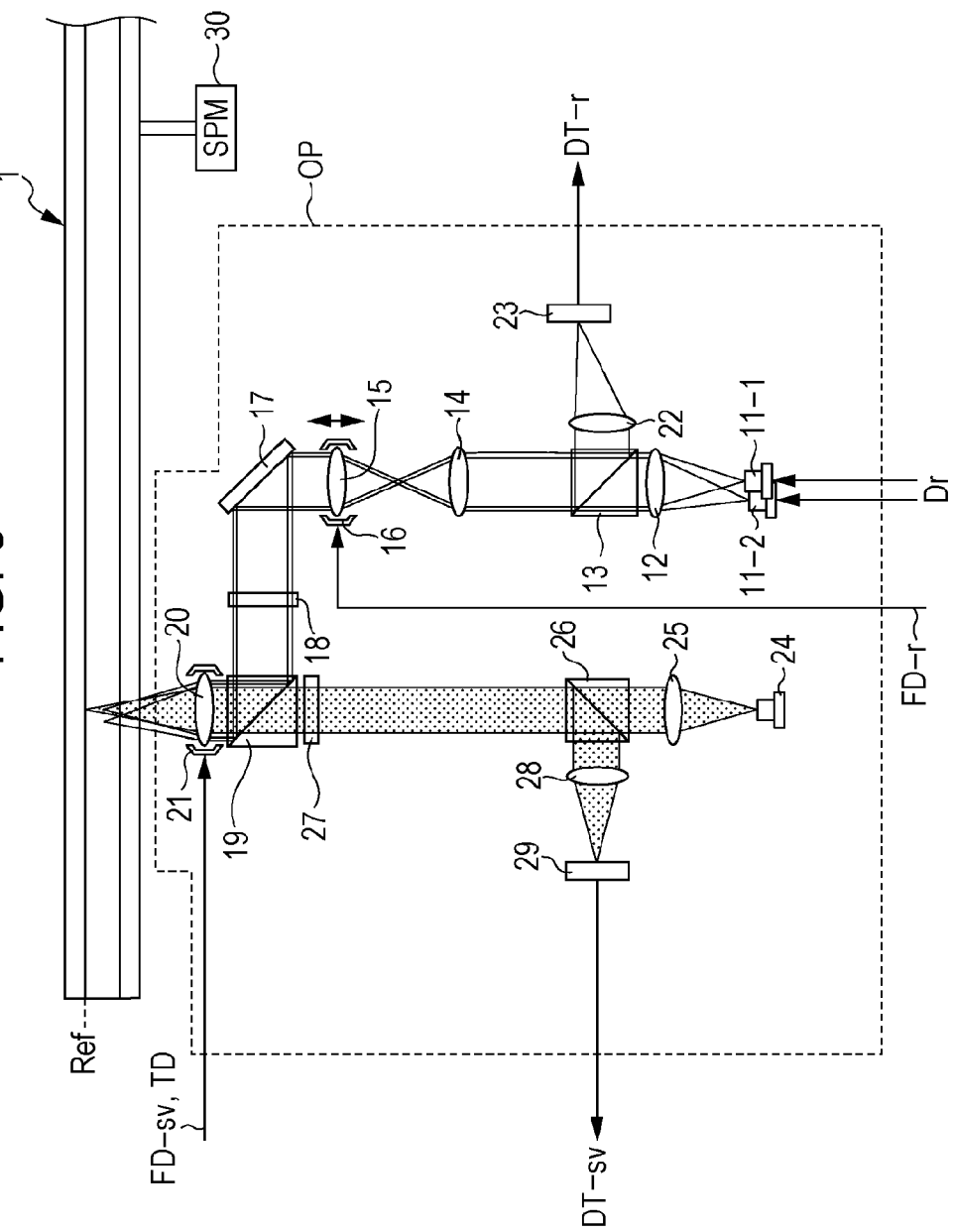
FIG. 5 is an explanatory diagram of a configuration of an optical system of a recorder/reproducer according to an embodiment.

FIG. 5 illustrates an internal configuration of the optical pickup OP included in the recorder/reproducer 10. Note that, as illustrated in FIG. 3B, a configuration example will be described here wherein two laser beams are output as the laser beams for recording layers, and also, the laser beam for reference plane is output. In the case of the method described in FIG. 3A, it has to be understood that the two systems of the laser beams for recording layers which will be described below are one system.

First, the multilayer recording medium 1 loaded in the recorder/reproducer 10 is set so that a center hole thereof is clamped in a predetermined location at this recorder/reproducer 10, and is in a state in which rotational driving by the spindle motor 30 illustrated in FIG. 4 is enabled. With the recorder/reproducer 10, the optical pickup OP is provided as a configuration for irradiating a laser beam for recording/reproducing on the multilayer recording medium 1 to be rotated and driven by the spindle motor 30.

Within the optical pickup OP, lasers 11-1 and 11-2 for recording layers which are light sources of the laser beams for recording layers. Also, there is provided a laser 24 for reference plane which is a light source of the laser beam for reference plane that is light for performing location control with the location guider formed on the reference plane Ref and reading of a reference plane address.

Also, with the optical pickup OP, there is provided an objective lens 20 serving as an output end to the multilayer recording medium 1 of the laser beams for recording layers and laser beam for reference plane. Further, there are provided a light-receiving unit 23 for recording layers for receiving a reflected beam from the multilayer recording medium 1 of the laser beams for recording layers, and a light-receiving unit 29 for reference plane for receiving a reflected beam from the multilayer recording medium 1 of the laser beam for reference plane.

With the optical pickup OP, there is formed an optical system for guiding the laser beam for recording layers to the objective lens 20 and also guiding a reflected beam from the multilayer recording medium 1 input to this objective lens 20 to the light-receiving unit 23 for recording layers. Note that, with the laser beams for recording layers of the two systems, for example, at the time of recording, one is used as a laser beam for recording, and the other is used as a laser beam for the ATS servo. Also, at the time of reproducing, an arrangement may be made wherein both laser beams are taken as laser beams for reproducing, and reproducing is performed on the spirals of a recording mark row having a double spiral shape at the same time. However, the use of the two laser beams for recording layers is not restricted to such use. For example, an arrangement may be made wherein the two laser beams for recording layers are both used for recording at the time of recording, and recording mark rows having a double spiral shape are formed at the same time. Further, description will be made with a configuration example wherein the recorder/reproducer 10 includes the one optical pickup OP, but it may also be assumed that the recorder/reproducer 10 includes multiple optical pickups OP. In this case, roles (utilizing method) of the laser beams for recording layers of the one or two systems in the optical pickups OP may variously be conceived.

The optical system for the laser beams for recording layers will specifically be described in accordance with the example in FIG. 5. The laser beams for recording layers of the two systems emitted from the lasers 11-1 and 11-2 for recording layers are converted so as to become parallel beams via a collimate lens 12, and then input to a polarization beam splitter 13. The polarization beam splitter 13 is configured so as to transmit the laser beams for recording layers thus input from the light sources.

The laser beam for recording layers transmitted from the polarization beam splitter 13 is input to a focus mechanism configured so as to include a fixed lens 14, a moving lens 15, and a lens driving unit 16. This focus mechanism is provided for adjusting of a focusing position regarding the laser beam for recording layers, and is configured so that a side closer to the lasers 11-1 and 11-2 for recording layers is taken as the fixed lens 14, and the moving lens 15 is disposed on a far side, and the moving lens 15 side is driven in a direction parallel to the laser optical axis by the lens driving unit 16.

The laser beam for recording layers passes through the fixed lens 14 and moving lens 15 which make up the focus mechanism is reflected at the mirror 17, and then is input to a dichroic prism 19 via a quarter-wave plate 18. The dichroic prism 19 is configured so that a selective reflection surface thereof reflects a beam having the same wavelength band as with the laser beam for recording layers, and transmits a beam having a wavelength other than that. Accordingly, the laser beam for recording layers thus input is reflected at the dichroic prism 19.

The laser beam for recording layers reflected at the dichroic prism 19 is irradiated (focused) on the multilayer recording medium 1 (target recording layer 3) via the objective lens 20 as illustrated in FIG. 5. There is provided to the objective lens 20 a biaxial actuator 21 which holds this objective lens 20 in a focus direction (direction attaching or detaching for the multilayer recording medium 1), and in a tracking direction (direction orthogonal to the focus direction, i.e., disc radial direction) so as to be displaced. A focus coil and a tracking coil are provided to the biaxial actuator 21, and driving signals (later-described drive signals FD-sv and TD) are given thereto respectively, and accordingly, the objective lens 20 is displaced in each of the focus direction and tracking direction.

Here, in response to the laser beam for recording layers being irradiated on the multilayer recording medium 1 as described above, a reflected beam of the laser beam for recording layers is obtained from this multilayer recording medium 1 (recording layer 3 to be reproduced). This reflected beam of the laser beam for recording layers is guided to the dichroic prism 19 via the objective lens 20, and reflected at this dichroic prism 19. The reflected beam of the laser beam for recording layers reflected at the dichroic prism 19 is input to the polarization beam splitter 13 via the quarter-wave plate 18→mirror→focus mechanism (moving lens 15→fixed lens 14).

The reflected beam of the laser beam for recording layers thus input to the polarization beam splitter 13 passes through the quarter-wave plate 18 twice at an outward trip and a return trip, and consequently, the polarization direction thereof is rotated 90 degrees as compared to the outward trip beam thereof. As a result thereof, the reflected beam of the laser beam for recording layers thus input is reflected at the polarization beam splitter 13.

The reflected beam of the laser beam for recording layers reflected at the polarization beam splitter 13 is condensed on a light-receiving face of the light-receiving unit 23 for recording layers via a condensing lens 22. A received light signal obtained by the light-receiving unit 23 for recording layers receiving the reflected beam of the laser beam for recording layers will hereinafter be referred to as a received light signal DT-r.

Also, within the optical pickup OP, there is formed an optical system for guiding the laser beam for reference plane emitted from the laser 24 for reference plane to the objective lens 20 and also guiding the reflected beam of the laser beam for reference plane from the multilayer recording medium 1 input to this objective lens 20 to the light receiving unit 29 for reference plane. As illustrated in FIG. 5, the laser beam for reference plane emitted from the laser 24 for reference plane is converted so as to become a parallel beam via the collimate lens 25, and then input to the polarization beam splitter 26. The polarization beam splitter 26 is configured so as to transmit the laser beam (outward trip beam) for reference plane thus input from the laser 24 for reference plane side.

The laser beam for reference plane transmitted the polarization beam splitter 26 is input to the dichroic prism 19 via a quarter-wave plate 27. As described above, the dichroic prism 19 is configured so as to reflect a beam having the same wavelength band as with the laser beam for recording layers and so as to transmit a beam having a wavelength other than that, and accordingly, the laser beam for reference plane transmits the dichroic prism 19 and is irradiated on the multilayer recording medium 1 (reference plane Ref) via the objective lens 20.

Also, the reflected beam of the laser beam for reference plane (reflected beam from the reference plane Ref) to be obtained in response to the laser beam for reference plane thus irradiated on the multilayer recording medium 1 transmits the dichroic prism 19 via the objective lens 20, and is input to the polarization beam splitter 26 via the quarter-wave plate 27. The reflected beam of the laser beam for reference plane thus input from the multilayer recording medium 1 side passes through the quarter-wave plate 27 twice at an outward trip and a return trip, and consequently, the polarization direction thereof is rotated 90 degrees as compared to the outward trip beam thereof, and accordingly, the reflected beam of the laser beam for reference plane is reflected at the polarization beam splitter 26.

The reflected beam of the laser beam for reference plane reflected at the polarization beam splitter 26 is condensed on a light-receiving face of the light-receiving unit 29 for reference plane via a condensing lens 28. A received light signal obtained by the light-receiving unit 29 for reference plane receiving the reflected beam of the laser beam for reference plane will hereinafter be referred to as a received light signal DT-sv.

Here, as illustrated in the previous FIG. 1, with the multilayer recording medium 1, the reference plane Ref is provided further to the rear side from the recording layer formation area 5, and accordingly, at the time of recording, focus servo control of the objective lens 20 is performed so that the laser beam for reference plane is focused on the reference plane Ref thus provided to the rear side of the recording layer formation area 5. Moreover, with regard to the laser beam for recording layers, the collimation state of the laser beam for recording layers input to the objective lens 20 is adjusted by the previous focus mechanism (lens driving unit 16) being driven by focus servo control based on the reflected beam of the laser beam for recording layers so that the laser beam for recording layers is focused on a recording layer 3 formed further to the front side from the reference plane Ref.

Also, tracking servo control of the laser beam for recording layers at the time of reproducing is performed so as to have a spot of this laser beam for recording layers follow a mark row formed on the recording layer 3 to be reproduced. That is to say, tracking servo control of the laser beam for recording layers at the time of reproducing may be realized by controlling the location of the objective lens 20 based on the reflected beam of this laser beam for recording layers. Note that focus servo control at the time of reproducing may be the same as at the time of recording.

Figure 6:
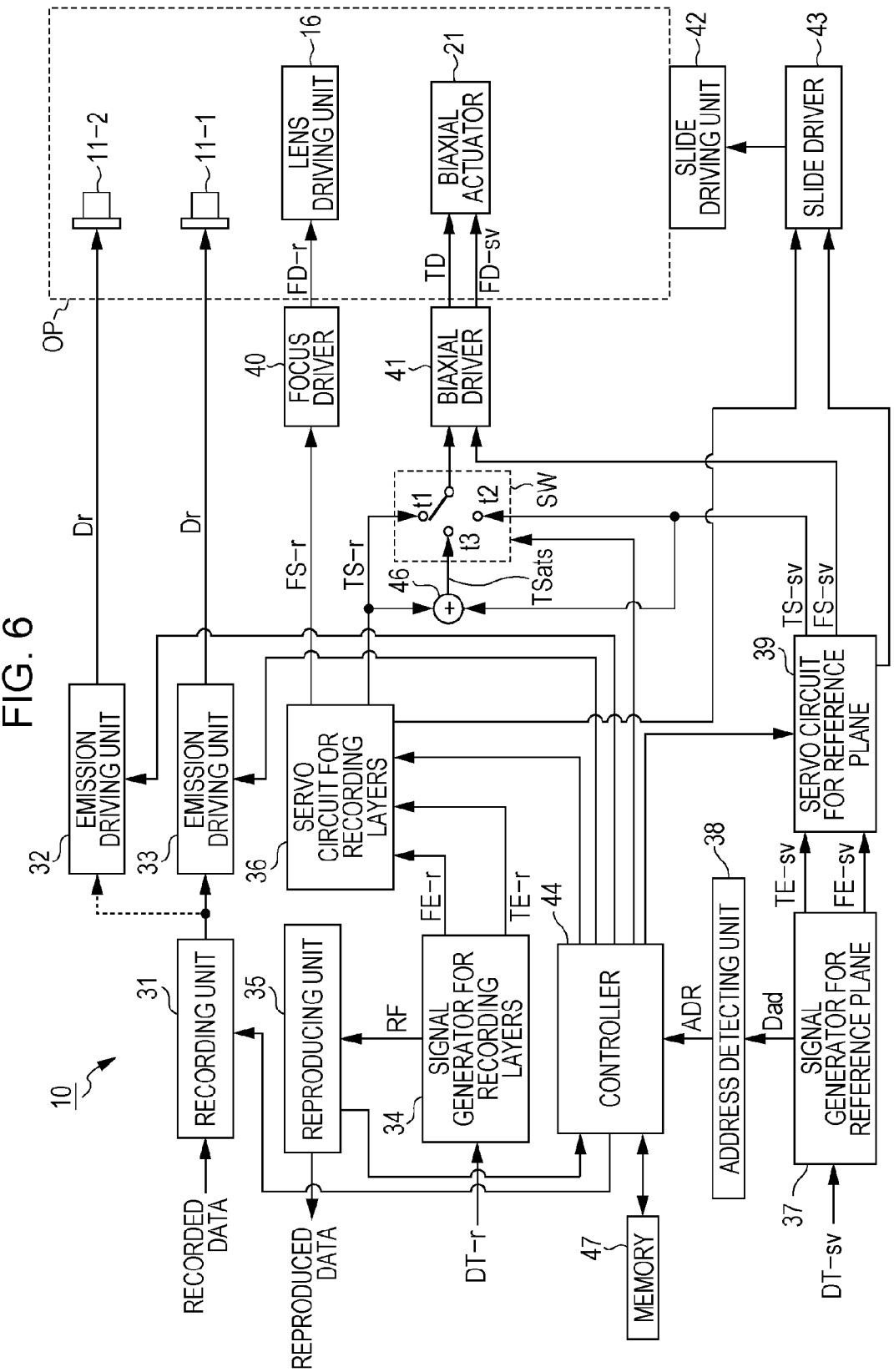
FIG. 6 is a block diagram of principal portions of a recorder/reproducer according to an embodiment.

FIG. 6 illustrates the detailed internal configuration of the recorder/reproducer 10 according to an embodiment. Note that, in FIG. 5, with regard to the internal configuration of the optical pickup OP, of the configuration illustrated in FIG. 4, only the lasers 11-1 and 11-2 for recording layers, lens driving unit 16, and biaxial actuator 21 are extracted and illustrated. Also, in this drawing, drawing of the spindle motor 30 and host interface 51 illustrated in FIGS. 4 and 5 is omitted. In FIG. 6, the units except for the controller 44, memory 47, optical pickup OP, and slide driving unit 42 may be conceived as the internal configuration of the recording/reproducing unit 50 in FIG. 4.

In FIG. 6, with the exterior of the optical pickup OP in the recorder/reproducer 10, there are provided a recording unit 31, an emission driving unit 32, an emission driving unit 33, a signal generator 34 for recording layers, a reproducing unit 35, a recording layer servo circuit 36, a focus driver 40, and a biaxial driver 41 as a configuration for performing recording/reproducing with a recording layer 3 in the multilayer recording medium 1 as a target, or location control of focus/tracking based on the reflected beam from the recording layer 3.

The recording unit 31 generates recording modulation code according to recorded data to be input. Specifically, the recording unit 31 obtains a recorded modulation code row which is, for example, a binary data row of "0" and "1" to be actually recorded with a recording layer 3 as a target by adding an error correction code to the recorded data to be input, or subjecting the recorded data to be input to predetermined recorded modulation coding, or the like. At this time, the recording unit 31 also performs addition processing of address information (recording layer address) for the recorded data according to an instruction from a later-described controller 44. The recording unit 31 gives a recorded signal based on the generated recorded modulation code row to one or both of emission driving units 33 and 32.

For example, in the event of executing the ATS (adjacent track servo) for forming a single-spiral-shaped or double-spiral-shaped track, at the time of recording, recording is performed regarding one of the laser beams for recording layers of the two systems, and tracking to an adjacent track is performed regarding the other using reproducing power. Therefore, the recorded signal generated by the recording unit 31 is given to only the one emission driving unit 33, the emission driving unit 33 generates a laser driving signal Dr based on the recorded signal to be input from the recording unit 31 at the time of recording, and emission-drives the laser 11-1 for recording layers based on the driving signal Dr. Thus, a mark row according to the recorded data may be recorded in a recording layer 3. At this time, the other emission driving unit 32 emission-drives the laser 11-2 for recording layers using reproducing power.

Also, while performing tracking control using the reference plane Ref, double spiral recording may also be performed regarding both of the laser beams for recording layers of the two systems at the same time. In such a case, the recorded signal generated by the recording unit 31 is given to the emission driving units 32 and 33 in a distributed manner. The emission driving units 32 and 33 generate a laser driving signal Dr based on the recorded signal, and the lasers 11-1 and 11-2 for recording layers are emission-driven based on the laser driving signal Dr. Thus, a mark row according to the recorded data may be recorded in a recording layer 3.

The signal generator 34 for recording layers generates an RF signal (reproduced signal), a focus error signal FE-r, and a tracking error signal TE-r based on the received light signal DT-r (output current) from the multiple light-receiving elements serving as the light-receiving units 23 for recording layers illustrated in FIG. 4. The focus error signal FE-r becomes a signal which represents focus error of the laser beams for recording layers as to the recording layer 3 serving as a recording/reproducing target. Also, the tracking error signal TE-r becomes a signal which represents location error in a radial direction of a spot position of the laser beam for recording layers as to a track formed in the recording layer 3. The RF signal obtained at the signal generator 34 for recording layers is supplied to the reproducing unit 35, and also, the focus error signal FE-r and tracking error signal TE-r are supplied to the servo circuit 36 for recording layers, respectively.

The reproducing unit 35 obtains reproduced data which is the previous recorded data restored by subjecting the RF signal to binarization processing, and predetermined demodulation processing such as decoding of recorded modulation code or error correction processing or the like. Also, the reproducing unit 35 also performs reproducing processing of a recording layer address inserted into recorded data. The recording layer address reproduced at the reproducing unit 35 is supplied to the controller 44.

The servo circuit 36 for recording layers performs servo calculation processing on the focus error signal FE-r, tracking error signal TE-r to generate a focus servo signal FS-r and a tracking servo signal TS-r. The tracking servo signal TS-r is supplied to a later-described switch SW.

Also, the focus servo signal FS-r is supplied to the focus driver 40. The focus driver 40 generates a focus drive signal FD-r based on the focus servo signal FS-r, and drives the lens driving unit 16 based on this focus drive signal FD-r. Thus, focus servo control regarding the laser beams for recording layers, that is, focus servo control for having the laser beam for recording layers focus on a recording layer 3 serving as a recording target is realized.

Also, the servo circuit 36 for recording layers also performs control regarding slide moving of the optical pickup OP by the slide driving unit 42. The slide driving unit 42 holds the entire optical pickup OP so as to be slide-driven in a tracking direction. The servo circuit 36 for recording layers extracts low-frequency components of the tracking error signal TE-r to generate a slide error signal, and generates a slide servo signal based on the slide error signal. This slide servo signal is given to the slide driver 43 to drive the slide driving unit 42, thereby realizing slide servo control of the optical pickup OP. Also, the servo circuit 36 for recording layers gives a control signal according to an instruction from the controller 44 to the slide driver 43, thereby realizing predetermined slide moving of the optical pickup OP by the slide driving unit 42. Also, the servo circuit 36 for recording layers also performs execution control of track jump operation for turning off the tracking servo, and jumping the spot of the laser beam for recording layers to another track, in response to the instruction from the controller 44.

A signal generator 37 for reference plane, an address detecting unit 38, and a servo circuit 39 for reference plane are provided to the recorder/reproducer 10 as a signal processing system regarding the reflected beam of the laser beam for reference plane.

The signal generator 37 for reference plane generates a necessary signal based on the received light signal DT-sv from the multiple light-receiving elements in the light-receiving unit 29 for reference plane illustrated in FIG. 5. Specifically, the signal generator 37 for reference plane generates a tracking error signal TE-sv which represents location error in the radial direction of the spot location of the laser beam for reference plane as to the location guider (pit row) formed in the reference plane Ref based on the received light signal DT-sv. Also, the signal generator 37 for reference plane generates a focus error signal FE-sv which represents focus error of the laser beam for reference plane as to the reference plane Ref (reflection film 7). Also, the signal generator 37 for reference plane generates an address detection signal Dad as a signal for detecting address information recorded in the reference plane Ref. In the event that a pit row is formed in the reference plane Ref, a summation signal has to be generated as this address detection signal Dad.

The address detection signal Dad generated by the signal generator 37 for reference plane is supplied to the address detecting unit 38. The address detecting unit 38 detects a reference plane address ADR recorded in the reference plane Ref based on the address detection signal Dad. The detected reference plane address ADR is supplied to the controller 44.

Also, the focus error signal FE-sv and tracking error signal TE-sv generated by the signal generator 37 for reference plane are supplied to the servo circuit 39 for reference plane.

The servo circuit 39 for reference plane performs servo calculation processing on the focus error signal FE-sv and tracking error signal TE-sv to generate a focus servo signal FS-sv and a tracking servo signal TS-sv.

The focus servo signal FS-sv is supplied to the biaxial driver 41. The biaxial driver 41 generates a focus drive signal FD-sv based on the focus servo signal FS-sv, and drives a focus coil of the biaxial actuator 21 based on this focus drive signal FD-sv. Thus, focus servo control regarding the laser beam for reference plane, that is, focus servo control for having the laser beam for reference plane focus on the reference plane Ref is realized.

Also, the servo circuit 39 for reference plane also performs control regarding slide moving of the optical pickup OP by the slide driving unit 42. Specifically, the servo circuit 39 for reference plane extracts low-frequency components of the tracking error signal TE-sv to generate a slide error signal, and generates a slide servo signal based on this slide error signal. This slide servo signal is given to the slide driver 43 to drive the slide driving unit 42, thereby realizing slide servo control of the optical pickup OP. Also, the servo circuit 39 for reference plane gives the slide driver 43 a control signal according to an instruction from the controller 44, thereby realizing desired slide moving of the optical pickup OP by the slide driving unit 42.

Also, the servo circuit 39 for reference plane also performs execution control of track jump operation for turning off the tracking servo, and jumping the spot of the laser beam for reference plane to another track, in response to the instruction from the controller 44.

The tracking servo signal TS-sv generated by the servo circuit 39 for reference plane is supplied to a t2 terminal of the switch SW.

Note that the tracking servo signals TS-r and TS-sv are supplied to a calculator 46, and a tracking servo signal TS-ats for the ATS servo is generated by predetermined calculation processing. The tracking servo signal TS-ats is supplied to a t3 terminal of the switch SW.

Here, the switch SW is provided for switching, regarding the tracking servo control of the object lens 20, tracking servo control for having the laser beam for reference plane follow the location guider on the reference plane Ref, tracking servo control for having the laser beam for recording layers follow a track on the recording layer 3, and the ATS control at the time of recording. For example, at the time of reproducing, there may be performed tracking servo control for having the laser beam for recording layers follow a track on the recording layer 3. At the time of recording, the ATS control is performed wherein recording is performed while tracking to an adjacent track. At the time of access (seek) for reproducing or recording, there is performed tracking servo control for having the laser beam for reference plane follow the location guider on the reference plane Ref.

The switch SW selectively outputs one of the tracking servo signals TS-r, TS-sv, and TS-ats in response to an instruction from the controller 44. The tracking servo signal TS selectively output by the switch SW is supplied to the biaxial driver 41, and the biaxial driver 41 drives the tracking coil of the biaxial actuator 21 using the tracking drive signal TD generated by the supplied tracking servo signal TS. Thus, the objective lens 20 is driven so as to have the spot of the laser beam for reference plane follow a track on the reference plane Ref, or driven so as to have the spot of the laser beam for recording layers follow a track on a recording layer 3.

The controller 44 is configured of a microcomputer including, for example, a CPU (Central Processing Unit), and memory (storage apparatus) such as ROM (Read Only Memory), RAM (Random Access Memory), and so forth, and performs the entire control of the recorder/reproducer 10 by executing control or processing in accordance with a program stored in the ROM or the like for example. For example, the controller 44 performs instructions for the servo circuit 36 for recording layers and servo circuit 39 for reference plane based on the recording layer address obtained at the reproducing unit 35, and the reference plane address ADR obtained at the address detecting unit 38 to perform seek operation control for moving the spot locations of the laser beam for reference plane and laser beam for recording layers to a predetermined address. Also, the controller 44 performs instructions for the servo circuit 36 for recording layers, servo circuit 39 for reference plane, and switch SW, thereby executing focus servo control or tracking servo control with a technique according to each case such as recording, reproducing, or seek using the reference plane Ref as to the multilayer recording medium 1.

The controller 44 performs, in response to a recording command or reproducing command from the host apparatus 100, the reproducing operation, recording operation, access (seek) operation, and servo execution control for these. Also, the controller 44 also performs recording operation for physical or logical format according to a format command from the host apparatus 100 as will be described later, or recording operation control serving as closing track processing according to recording progress. Also, the controller 44 performs, other than instructions from the host apparatus, for example, such as readout or updating of the management information in the multilayer recording medium 1, reproducing operation, recording operation, access (seek) operation, and servo execution control for these as appropriate.

The memory 47 is illustrated as a work area and a RAM area where the controller 44 stores various types of information. For example, the memory 47 is used for storing communication data with the host apparatus, storing laser power serving as an OPC result regarding each layer, and storing management information read out from the multilayer recording medium 1, management information to be updated according to recording operation, and so forth.

4. Track Management According to Embodiment

4-1. File System and Track Management

A track management method serving as an embodiment will be described. Note that track management which will be described below includes processing that the drive control unit 101 of the host apparatus 100 performs as file system management, and processing to be performed by the controller 44 of the recorder/reproducer 10.

Specifically, with an embodiment, as the file system management by the drive control unit 101 there will be performed track setting processing wherein multiple tracks serving as continuous recording areas (SRR: Sequential recording range) are set to one layer of the multilayer recording medium 1 according to recording purpose, and closing track processing wherein each track is set to a continuous recording completion state within one layer alone.

Note that this processing is reflected on the multilayer recording medium 1 by the drive control unit 101 instructing the controller 44 of the recorder/reproducer 10.

The track management according to the controller 44 of the recorder/reproducer 10 mentioned here is, in the event that the controller 44 has determined that a certain layer in the multilayer recording medium 1 is in a recording disabled state, processing for enabling the host apparatus 100 (drive control unit 101) to recognize that all of tracks in this layer are in a recording disabled state.

As a technique for enabling the drive control unit 101 to recognize that a track is in a recording disabled state, there are various techniques, and will be described later, but a technique will be described as an example wherein the NWA (Next Writable Address) is set to an invalid state regarding all of tracks in a layer determined to be in a recording disabled state.

Now, first, as a comparative example as to the embodiment, FIGS. 7A and 7B illustrate a logical layout and a physical layout of a file system (conforming to UDF (Universal Disk Format)) to be used for one-layer disc (single layer disc).

FIG. 7A illustrates, as a logical layout of the file system, an example wherein five tracks TK#1 to TK#5 have been set in volume space. Note that a spare area is set outside the volume space. The track TK mentioned here is an increment wherein information is consecutively recorded in a physical area on an optical disc, and is referred to as the above-mentioned SRR, for example. With this example, the track TK#1 becomes address space where there is recorded management information such as a volume structure (Volume Structure), a metadata file FE (Metadata File File Entry), a metadata mirror file FE (Metadata Mirror File File Entry), and so forth. The track TK#2 is a continuous recording area of a metadata file, and becomes address space where a file set descriptor, and a file entry serving as the root directory are recorded. The track TK#3 becomes address space where user data is consecutively recorded, for example. The track TK#4 is a continuous recording area of a metadata mirror file (copy of metadata), and becomes address space where a file set descriptor (FSD: File Set Descriptor) and a file entry (File Entry) are recorded. The track TK#5 becomes address space where an AVDP (Anchor Volume Descriptor Pointer) is recorded. Note that details regarding the above-mentioned each data (volume structure, metadata file FE, metadata mirror file FE, file set descriptor, AVDP, etc.) have been described in "Universal Disk Format Specification Revision 2.50" OSTA, 2003, or the like.

As illustrated in FIG. 7B, these tracks TK#1 to TK#5 are physically disposed in a layer L0 of the 1-layer disc. With regard to the tracks TK#1 to TK#5, according to data recording of each, an NWA (Next Writable Address) is updated to the next address of a recorded address, and at the time of recording, recording is performed from an address indicated with the NWA. Thus, with the tracks TK#1 to TK#5, recording advances by physical areas within a track being sequentially used. In FIG. 7B, a shaded portion indicates an area where recording has been performed (note that a recorded area is similarly illustrated as a shaded portion in later-described FIGS. 8B, 9B, 10, 11, 12, and 13).

Figure 8A:
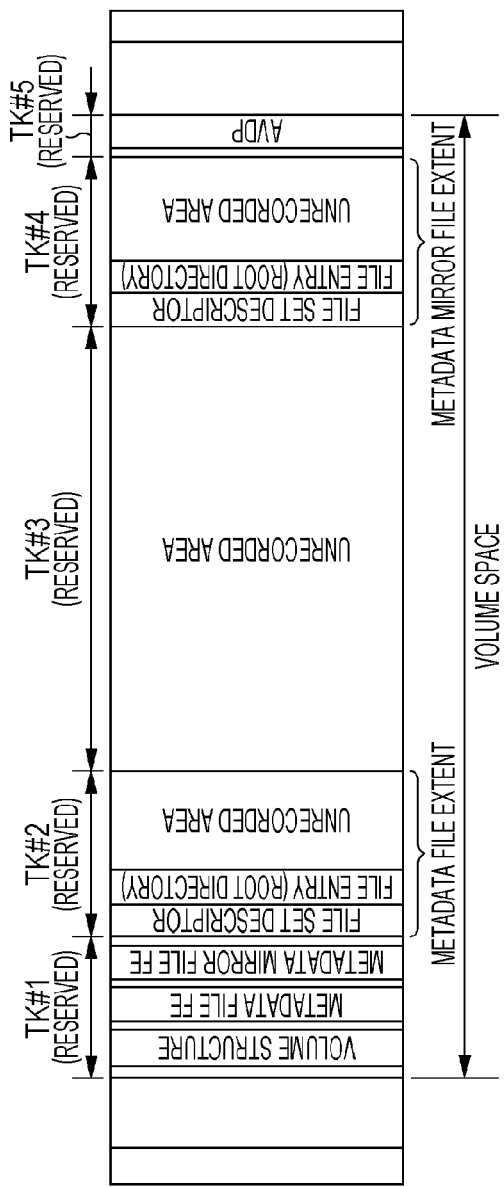
FIGS. 8A and 8B are explanatory diagrams of a file system (multilayer) serving as a comparative example.
Figure 8B:
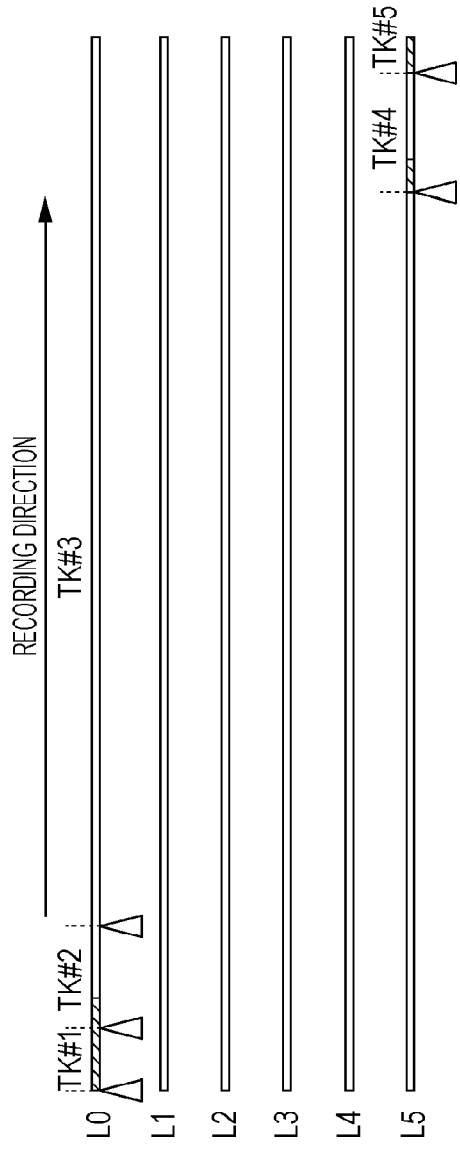

In the event of a 1-layer disc, there is the layer L0 alone as a physical recording area, and consequently, as illustrated in FIG. 7B, the tracks TK are formed in the layer L0. Now, FIG. 8 illustrates an example of a multilayer disc serving as a comparative example. The logical layout in FIG. 8A is generally the same as with the schematic diagram 7A. FIG. 8B illustrates a physical layout example in the event of a 6-layer disc. Track recording of the logical layout in FIG. 8A is realized using areas of layers L0 to L5. The layers L0 to L5 are taken as one physical recording space, and the tracks TK#1 to TK#5 are set. With this example, the tracks TK#1 and TK#2 are set within the layer L0, and the track TK#3 is set over a range of the layers L0 to L5. The tracks TK#4 and TK#5 are set in the rear edge area of the layer L5. That is to say, this example in FIGS. 8A and 8B is an example where the file system conforming to the 1-layer disc has been applied to a multilayer disc by simply expanding the entire of each recording layer without change.

However, in the event of applying the file system as illustrated in FIGS. 8A and 8B to the multilayer recording medium 1 such as a multilayer disc or the like, this includes the following problem. For example, with regard to writing of metadata and writing of metadata mirror, operation efficiency deteriorates. This is because a layer has to greatly be moved. Also, a layer on the rear side is influenced by a recording situation of a layer on the front side as viewed from the laser entry face side, and tends to execute unsuitable recording. For example, let us say that recording of user data at the track TK#3 has advanced, and has reached the layer L1. With regard to the tracks TK#1 and TK#2, the recorded layer L1 exists on the laser entry face side, which may disturb recording to the tracks TK#1 and TK#2 in the future, for example, updating of the management information in accordance with recording of user data, or the like.

That is to say, a file system according to the related art and a physical track management method have many disadvantageous points for the multilayer recording medium 1. Therefore, with the present embodiment, track management will be performed as follows, which will be described with reference to FIGS. 9, 10, 11, 12, and 13.

Figure 9A:
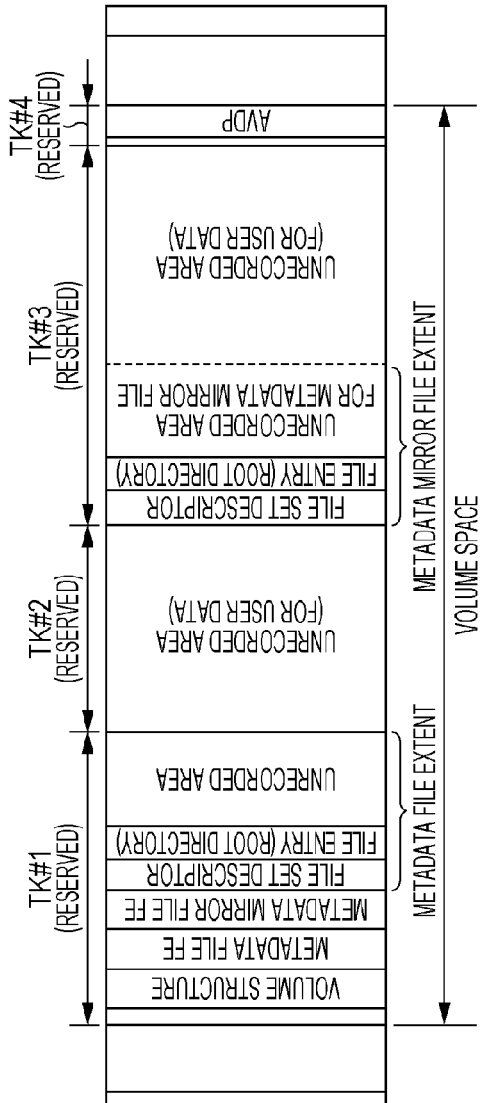
FIGS. 9A and 9B are explanatory diagrams of a file system according to an embodiment.

FIG. 9A is a logical layout example of a file system according to an embodiment. With an initial state, four tracks TK#1 to TK#4 are set in the volume space as an example. With this example, the track TK#1 becomes address space where a volume structure, a metadata file FE, a metadata mirror file FE, a file set descriptor, and a file entry serving as the root directory are recorded. That is to say, the track TK#1 is taken as a management information track where a management information file is taken as a recording purpose. The track TK#2 becomes address space where user data is consecutively recorded, for example. That is to say, the track TK#2 becomes a user data track of which purpose is to record user data. The track TK#3 is a continuous recording area of a metadata mirror file (copy of metadata), and becomes address space where a file set descriptor and a file entry are recorded. That is to say, the track TK#3 becomes a mirror track where a mirror file of management information is taken as a recording purpose. The track TK#4 becomes address space where an AVDP (Anchor Volume Descriptor Pointer) is recorded.

Figure 9B:
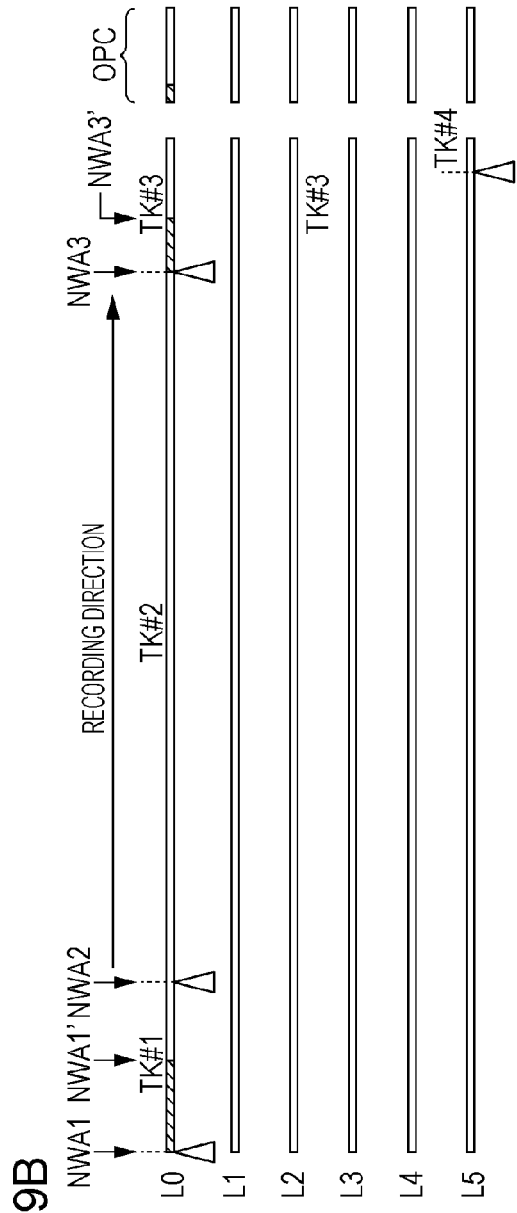

Such tracks TK#1 to TK#4 are set on the multilayer recording medium 1 as with FIG. 9B in an initial state using format processing. That is to say, with the layer L0 which is the rear-most side as viewed from the laser entry face side, the tracks TK#1, TK#2, and TK#3 are set. The track TK#4 is set to the rear edge portion of the layer L5 which is the front-most side as viewed from the laser entry face side. Now, let us say that, with the layers L0 to L5, recording has advanced with a parallel track path. With this drawing, for example, with all of the layers L0 to L5, recording has advanced from the left towards the right (e.g., from the outer circumference to the inner circumference of a disc).

This initial state is, as viewed regarding the layer L0, a state in which the tracks TK#1 (management information track), TK#2 (user data track), and TK#3 (mirror track) for each recording purpose are set. Note that the layers L2 to L5 are in an unused state other than the AVDP (track TK#4), and no track setting has been performed. Therefore, up to an area immediately before the track TK#4 of the layers L1 to L5 is in a state transiently managed as the track TK#3.

Also, FIG. 9B illustrates the NWAs (NWA1, NWA2, and NWA3) of the tracks TK#1, TK#2, and TK#3. At the time of track setting, each NWA indicates the head address of the track. At the time of formatting, with the track TK#1, management information is recorded, and accordingly, the NWA is changed from an address that the NWA1 indicates to an address that the NWA1' indicates. Also, with the track TK#3, a management information mirror file is recorded, and accordingly, the NWA is changed from an address that the NWA3 indicates to an address that the NWA3' indicates.

Also, FIG. 9B (FIGS. 10 to 13 are also the same) also illustrates an OPC area (Optimum Power Control Area: test write area) in the layers L0 to L5. The OPC areas are set in a predetermined position such as the inner circumferential side or outer circumferential side of a disc or the like, for example.

In the case of the multilayer recording medium 1, in order to optimize recording operation in the layers L0 to L5, processing is performed wherein the OPC areas are used, OPC, that is, test write according to various types of recording laser power is performed to distinguish the optimal recording laser power. At the time of recording of actual user data or the like, determination is made in the test write using the OPC areas, and laser irradiation according to the optimal recording power is executed.

An optimal laser power condition differs for each layer, and accordingly, an OPC area is provided to each layer, and with regard to recording operation at each layer, an optimal power condition has to be obtained by performing test write at the layer thereof.

In other words, with a layer of which the OPC area has completely been used, even if there is a remaining area serving as a track, recoding may not be performed (recording with high quality may not be ensured) thereafter.

FIG. 9B illustrates a state in which test write for OPC has been performed by a part of the OPC area of the layer L0 being used. This is because test write has been performed prior to writing of information to the tracks TK#1 and TK#3.

After formatting is thus performed, track setting is sequentially performed on a layer on the front side according to progress of recording.

For example, let us say that recording of user data regarding the track TK#2 of the layer L0 has advanced, and the track TK#2 has been completely used. In this case, as illustrated in FIG. 10A, the track TK#2 is closed. "close" mentioned here is a state in which recording of a track thereof has been completed, and is a management state in which this track will not be used for sequential recording serving as a continuous recording area.

Note that data rewriting of a closed track may be handled by POW (Pseudo Over Write) using sparing processing. In the event that a sparing area has been prepared on the multilayer recording medium 1, logical rewriting (POW) has to be performed using the sparing area thereof, and even if a sparing area has not particularly been prepared, POW may be performed using another track area as a sparing area, for example.

The track TK#2 is closed, and also as with the layer L0, the tracks TK#4 (management information track), TK#5 (user data track), and TK#6 (mirror track) for each recording purpose is set to the layer L1 next to the front side. In this state, recording of user data is sequentially executed using the track TK#5.

With regard to the layer L0 at this point-in-time, the tracks TK#1, TK#2, and TK#3 are in a state completed only within the layer L0. Note that, with the state in FIG. 10A, the tracks TK#1 and TK#3 have not been closed. Also, the OPC area in the layer L0 has not also completely been used. In this case, recording of a management information file or mirror file may be performed using the tracks TK#1 and TK#3. Closer to the laser entry face side than the tracks TK#1 and TK#3, the tracks TK#4 and TK#6 are set to the layer L1 so as to be overlapped, but this is because the tracks TK#4 and TK#6 have not been recorded yet, and the tracks TK#4 and TK#6 do not have an adverse affect on recording of the tracks TK#1 and TK#3. The tracks TK#1 and TK#3 are closed in the event of each of the areas has completely been used, or at the time of the NWA becomes invalid for any reason, or the like. Thus, all of the tracks TK#1, TK#2, and TK#3 are in a state managed as a track of which the consecutive recording has been completed within the layer L0 alone.

Also, in FIG. 10A, at the time of the track TK#2 being closed, the tracks TK#4 to TK#6 have newly been set in the layer L1 by dividing the track TK#3, but this has a meaning that the track TK#5 to be used for recording of user data is prepared. In the event that the track TK#1 has previously completely been used prior to the track TK#2, the track TK#1 is closed, and the tracks TK#4 to TK#6 are newly set to the layer L1. That is to say, the track TK#4 to be used for recording of the management information is prepared.

Note that the track TK#4 serving as an AVDP recorded area on the terminal side in the volume space is in a state managed as the track TK#7 by this track setting.

FIG. 10B illustrates a case where recording of user data regarding the track TK#5 of the layer L1 has advanced from the state in FIG. 10A, and the track TK#5 has completely been used. In this case, in the same way as described above, the track TK#5 is closed. Next, the tracks TK#7 (management information track), TK#8 (user data track), and TK#9 (mirror track) for each recording purpose is set to the layer L2 next toward the front side. In this state, recording of user data is sequentially executed using the track TK#8. The track TK#7 serving as an AVDP recorded area on the terminal side in the volume space is in a state managed as the track TK#10 by this track setting.

Figure 11A:
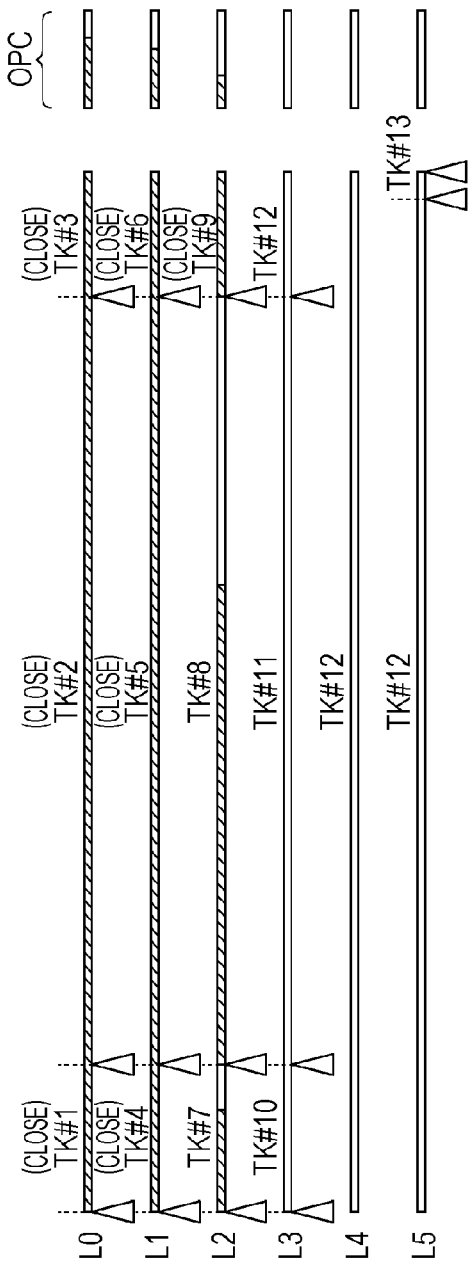
FIGS. 11A and 11B are explanatory diagrams of track setting according to an embodiment.

FIG. 11A illustrates a case where the track TK#9 of the layer L2 has completely been used from the state in FIG. 10B. In this case, the track TK#9 is closed. Next, the tracks TK#10 (management information track), TK#11 (user data track), and TK#12 (mirror track) for each recording purpose is set to the layer L3 next toward the front side. In this state, recording of the mirror file thereafter is sequentially executed using the track TK#12. The track TK#10 serving as an AVDP recorded area on the terminal side in the volume space is managed as the track TK#13 by this track setting.

Figure 11B:
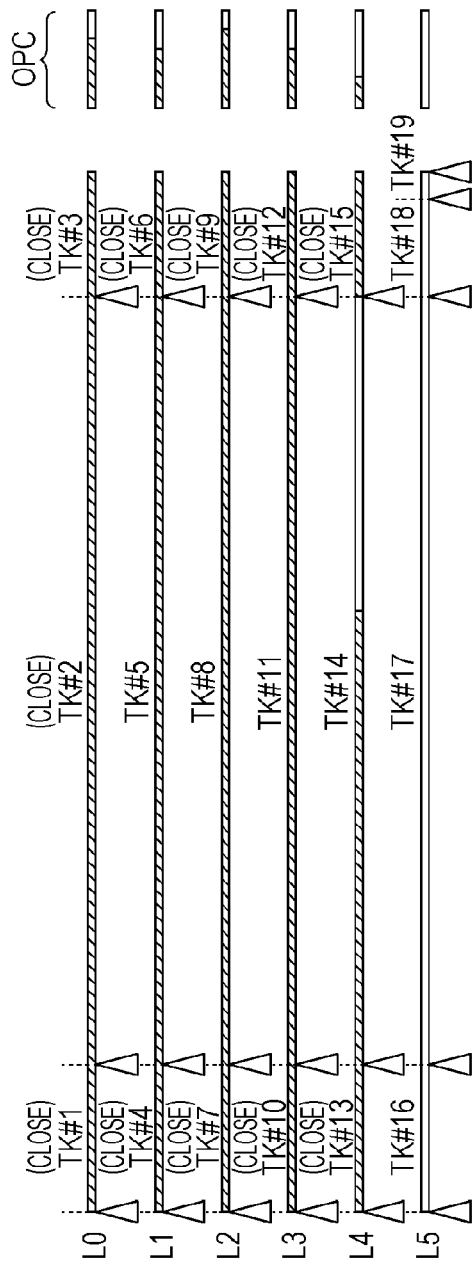

FIG. 11B illustrates a state in which tracks have been set up to the layer L5 in the same way. The tracks TK#16, TK#17, and TK#18 have been set to the layer L5. With the layer L5 alone, there is a track where an AVDP has been recorded (track TK#19 in this point-in-time), and accordingly, the number of tracks becomes four. Let us say that, with the layers L0 to L5, three tracks for each recording purpose are set thereto respectively, and moreover, each track is completed within just one layer.

With the track management method on the file system according to the present embodiment as with the above-mentioned example, track setting processing is performed wherein multiple tracks serving as continuous recording areas are set to one layer in the multilayer recording medium 1 according to a recording purpose. For example, a management information track, a user data track, and a mirror track are set. Also, closing track processing is also performed wherein each track is set to a continuous recording completed state within one layer alone. Thus, a management information file and a mirror file may be recorded in positions separated as the track TK#1 and TK#3 for example in a distributed manner, which is strong for a defect, and improves reliability of the management information (metadata and so forth). Also, recording of an management information file and a mirror file may be performed within the same layer, and operation performance is also improved. Also, recording of a management information file, user data, and a mirror file may effectively be performed on each track in each layer, and also, recording is distributed into the tracks, and accordingly, expansion of metadata in the multilayer recording medium 1 may simply be performed with high reliability being maintained.

According to recording operation, in the event that recording for a certain track of a certain layer has advanced, and the area of this track within this layer is an already recorded state, closing track processing for this track is performed. At this time, track setting processing is performed as to another layer wherein multiple tracks are set according to recording purpose. Thus, recording of user data, recording of a management information file, and recording of a mirror file may be executed using each layer. In other words, there is secured a state in which file recording with benefit of large capacity owing to multilayering being received may normally be executed. Though specific examples will be described in later-described FIGS. 15 to 18, for example, a user data track is completed in each layer, but the user data track in each layer may consecutively be used, and accordingly, capacity of each layer is not wasted. This may similarly be applied to a management information track and a mirror track.

Also, at the time of performing the track setting processing, of layers which have not been taken as a track setting processing target, the track setting processing is performed on a layer positioned at the rear-most side as viewed from the laser beam entry face side as a target. In particular, as for the multilayer recording medium 1 where no track has been set, first, as illustrated in FIG. 9B, the track setting processing is performed on the layer L0 positioned at the rear-most side as viewed from the laser beam entry face side, and also, recording operation is executed from a track of the layer L0 at the rear-most side. Also, thereafter, according to progress of recording, track setting is performed in order on the next layer on the front side. Layers are used from the rear side in order, and accordingly, each layer is prevented from being influenced by the recorded state of layers toward the front side, and consequently, suitable recording operation is ensured. In particular, as illustrated in FIGS. 10 and 11, a management information track, a user data track, and a mirror track in each layer are each set so as to be overlapped in the incident light axial direction of a laser beam. That is to say, tracks having the same purpose are disposed so as to be overlapped in the laser beam axial direction. Thus, recording of a management information file, user data, and a mirror file may be executed by using an area without waste in order from layers on the rear side. That is to say, each of a management information file, user data, and a mirror file may sequentially be recorded without being influenced by layers closer to the front side.

For example, as described above, after the state in FIG. 10A, even when performing recording of user data on the track TK#5 in the layer L1, a management information file and a mirror file may be recorded in the tracks TK#1 and TK#3 in the layer L0 which have not been closed (have not completely been used). This is because the track TK#5 where recording of user data is performed is not overlapped with the tracks TK#1 and TK#3. Accordingly, a management information file and a mirror file are recorded first using remaining areas in the tracks TK#1 and TK#3 without immediately using the tracks TK#4 and TK#6, whereby the area on the multilayer recording medium 1 may be used without waste.

In the case of the present embodiment, in addition to track management on the file system thus described, the following processing will be performed as processing relating to track management by the controller 44 of the recorder/reproducer 10.

Specifically, in the event that determination is made that a certain layer in the multilayer recording medium 1 is in a recording disabled state, the controller 44 enables the host apparatus 100 (drive control unit 101) to recognize that all of tracks in this layer are in a recording disabled state.

NWA invalidation is performed as a technique for enabling the drive control unit 101 to recognize that a track is in a recording disabled state.

Also, in the event that with regard to each layer, the OPC area in the layer thereof has completely been used, the controller 44 determines that the layer is in a recording disabled state.

Alternatively, the controller 44 determines, based on a recording error at the time of recording or the situation of sparing processing regarding a certain layer, whether or not the layer is in a recording disabled state.

Figure 12A:
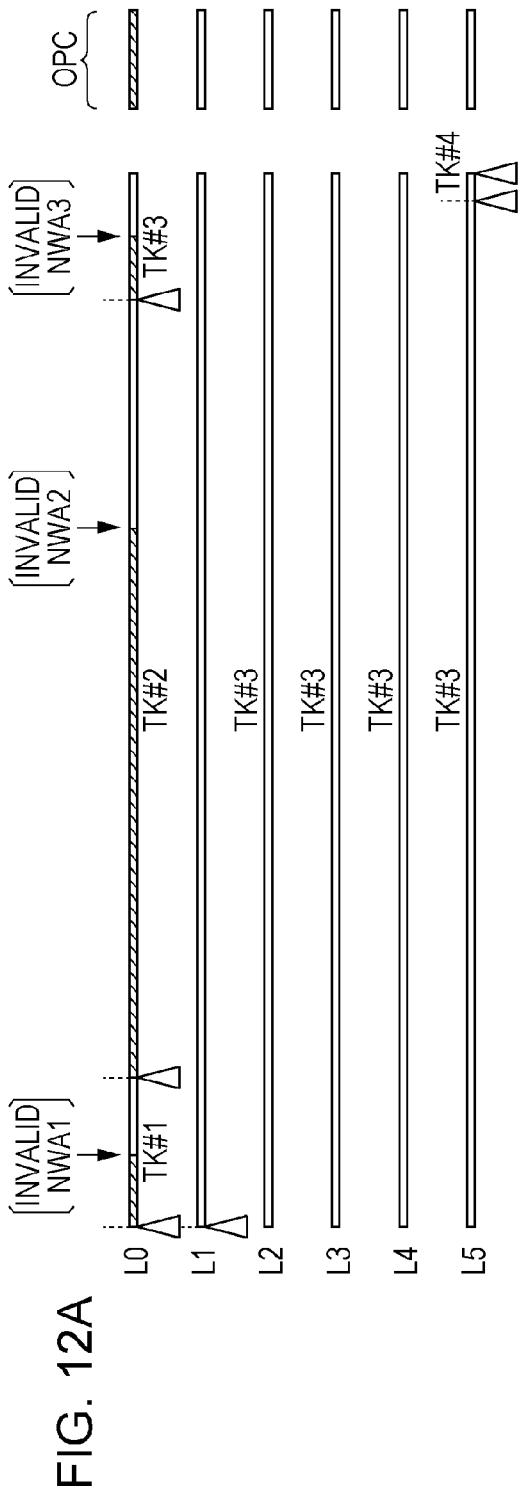
FIGS. 12A and 12B are explanatory diagrams of NWA invalidation according to an embodiment.

FIG. 12A illustrates processing wherein the controller 44 invalidates the NWA regarding a layer of which the OPC area has completely been used.

This FIG. 12A illustrates a state in which user data and management information have been recorded using the tracks TK#1, TK#2, and TK#3 after formatting was performed as illustrated in FIG. 9B. With the process of this recording operation, as illustrated in FIG. 12A, let us say that the OPC area in the layer L0 has completely been used as illustrated as a shaded portion.

With regard to the tracks TK#1, TK#2, and TK#3, the values of the next recording addresses thereof are managed as NWA1, NWA2, and NWA3, but upon detecting that the OPC areas have completely been used, the controller 44 invalidates all of the NWA1, NWA2, and NWA3 of these three tracks TK#1, TK#2, and TK#3. That is to say, with each of the tracks TK#1, TK#2, and TK#3, let us assume that there is no NWA though a recordable area has remained.

Figure 12B:
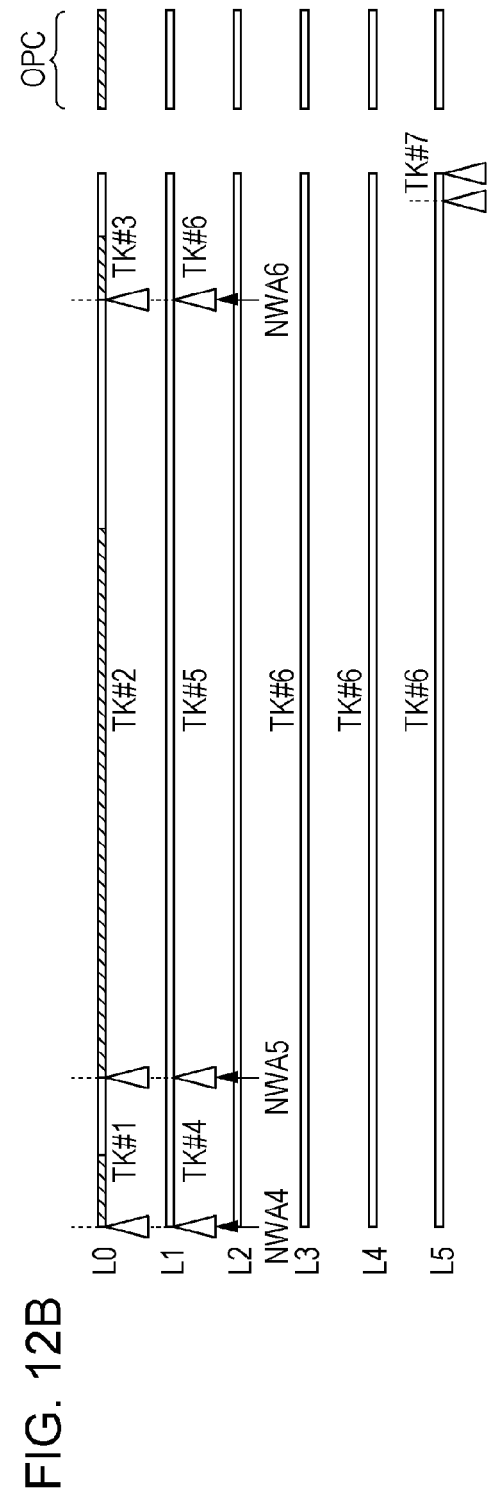

Upon the tracks TK#1, TK#2, and TK#3 having been set to such a NWA invalid state, when the drive control unit 101 performs subsequent recording request, according to the NWA invalid states of the tracks TK#1, TK#2, and TK#3 being detected, as illustrated in FIG. 12B, track setting is performed on the next layer L1. Hereinafter, management information is recorded from a position indicated with the NWA4 of the management information track TK#4, user data is recorded from a position indicated with the NWA5 of the user data track TK#5, and a mirror file is recorded from a position indicated with the NWA6 of the mirror track TK#6, respectively.

Specifically, the OPC area has completely been used, subsequent recording is not performed regarding a layer where OPC may not be executed, and recording is performed using another layer while avoiding recording where quality assurance may not be made.

Figure 13A:
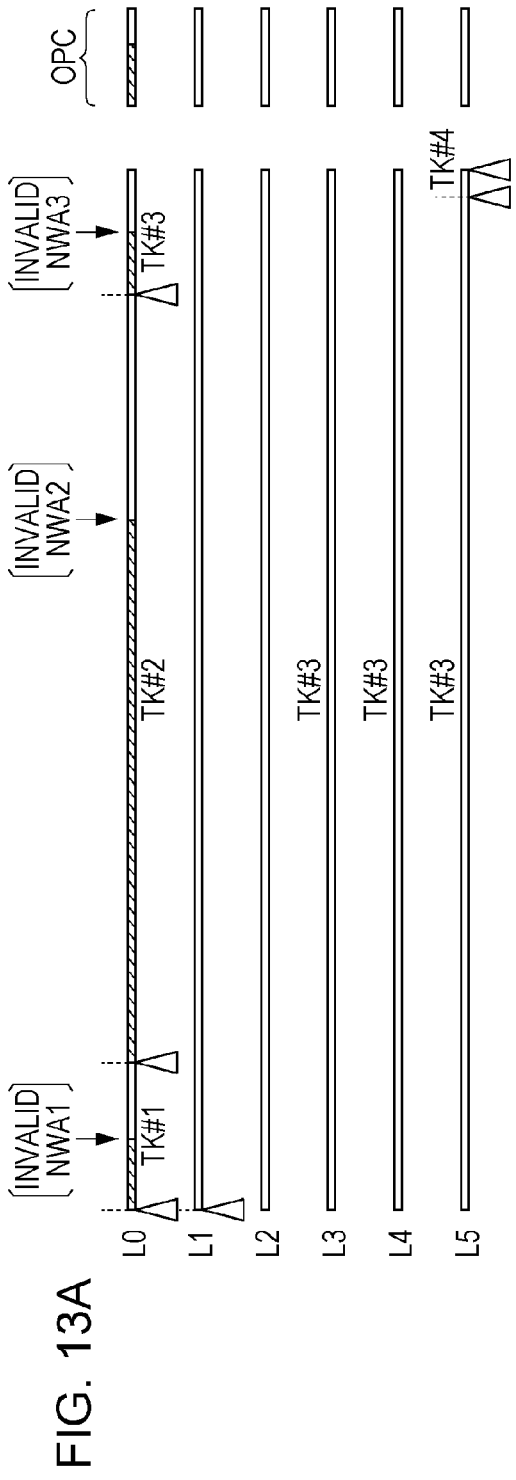
FIGS. 13A and 13B are explanatory diagrams of NWA invalidation according to an embodiment.

FIG. 13A illustrates processing wherein the controller 44 invalidates the NWA by determining that the layer thereof is in a recording disabled state based on a recording error at the time of recording or the situation of sparing processing.

FIG. 13A also illustrates a state in which user data and management information have been recorded with the tracks TK#1, TK#2, and TK#3 after formatting as illustrated in FIG. 9B, for example. With the process of this recording operation, in the event that sparing processing serving as defect sparing has frequently occurred, for example, and the number of times thereof has become equal to or greater than a predetermined number of times, the controller 44 determines that, with this layer L0, layer quality is poor, and recording with high quality may not be performed. Alternatively, in the event that the number of times of recording errors at recording operation opportunities according to recording request from the drive control unit 101 has become equal to or greater than a predetermined number of times, the controller 44 determines that, with this layer L0, layer quality is poor, and recording with high quality may not be performed.

In such a case, the controller 44 invalidates all of the NWA1, NWA2, and NWA3 of the three tracks TK#1, TK#2, and TK#3 in the layer L0. That is to say, with each of the tracks TK#1, TK#2, and TK#3, let us assume that there is no NWA though a recordable area remains in each.

Figure 13B:
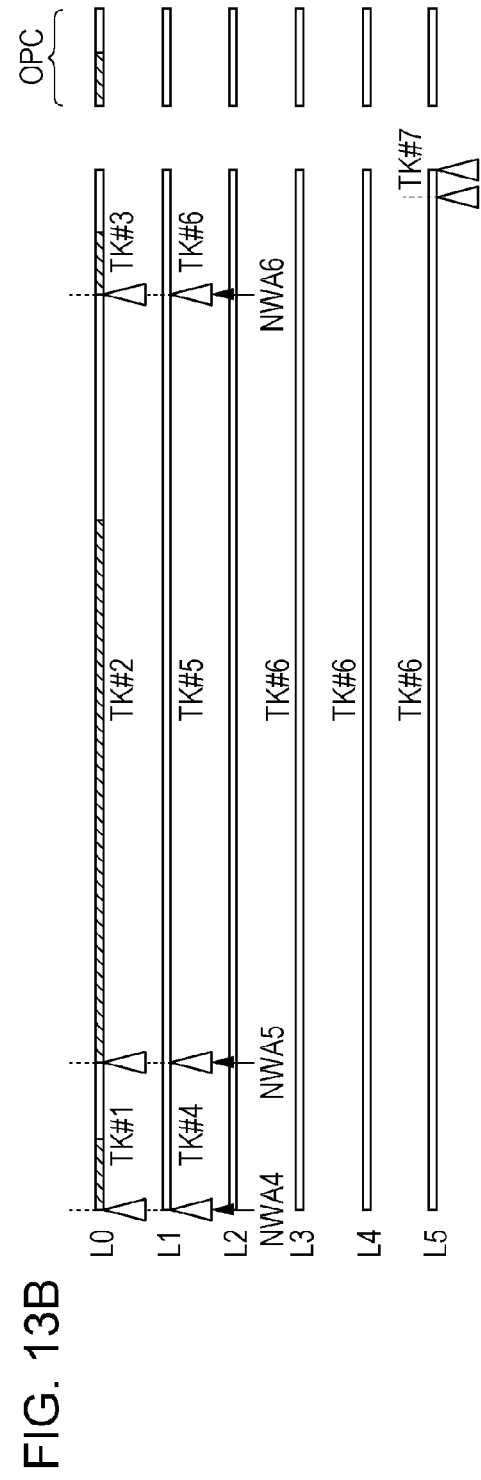

Upon the tracks TK#1, TK#2, and TK#3 having been set to such a NWA invalid state, in the same way as with the above-mentioned case, when the drive control unit 101 performs subsequent recording request, according to the NWA invalid states of the tracks TK#1, TK#2, and TK#3 being detected, as illustrated in FIG. 13B, track setting is performed on the next layer L1. Hereinafter, recording is performed with the management information track TK#4, user data track TK#5, and mirror track TK#6.

A layer determined to be poor in layer quality in this way is placed in a state in which subsequent recording is not performed, and recording is performed with another layer while avoiding recording without quality assurance.

Track management by the controller 44 is performed as exemplified in FIGS. 12 and 13, and accordingly, recording with low quality is avoided, and also, suitable recording with another layer may be executed.

The controller 44 has to perform NWA invalidation on management information, and does not have to perform processing for informing the host apparatus 100 that a certain layer is not suitable for recording, for example.

Specifically, the host apparatus 100 side does not have to implement a special command for implementing a method for knowing recording propriety in increments of layers, and may know recording propriety of a layer using a normal command.

Also, as a method for informing the recording propriety in increments of layer from the recorder/reproducer 10 side, it may be conceived to employ a so-called vendor unique command, but such a command does not have to be prepared.

Moreover, recording propriety may not be controlled in increments of the entirety of the multilayer recording medium 1 but in increments of layers. For example, when setting the entirety of the multilayer recording medium 1 to recording prohibition, even if there is a recordable area, recording may not be performed, but such a situation may be avoided, and accordingly, even when there is an OPC-multiform layer or poor layer, this may be handled with the minimum capacity lowering. That is to say, there is an advantage wherein capacity may effectively be used while maintaining reliability as recording operation with a multilayer recording medium as an target.

4-2. Format (Initial Track Setting)

Hereinafter, description will be made regarding a specific processing example of the drive control unit 101 and controller 44 for realizing the above-mentioned track management. First, now, description will be made regarding an example of format processing to be performed by the drive control unit 101 at the time of a command for file system format being issued at the host apparatus 100, for example.

Note that, format processing, and processing as recording/closing track/track setting of the next layer to be described in the following FIGS. 14 to 18 will be described as processing of the drive control unit 101, but may also specifically be performed as an application or OS at the host apparatus 100.

Also, a WO (Write Once) type multilayer optical disc is assumed as the multilayer recording medium 1.

Figure 14:
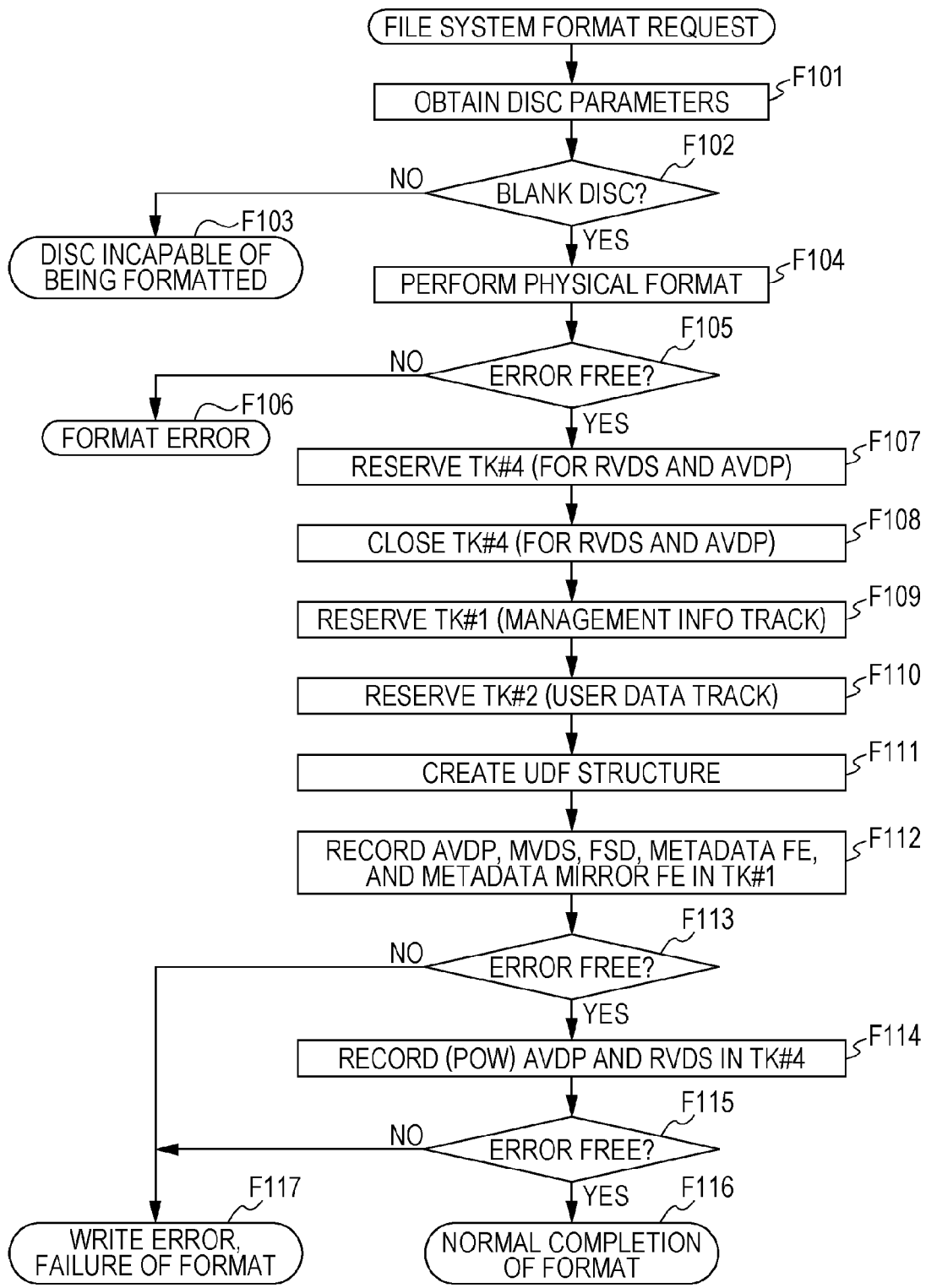
FIG. 14 is a flowchart of format processing according to an embodiment.

FIG. 14 illustrates processing of the drive control unit 101 at the time of a format command. In the event of having received a format request, in step F101 the drive control unit 101 obtains disc parameters of the multilayer recording medium 1, and in step F102 confirms whether or not this is a blank disc. In the event of other than a blank disc, the drive control unit 101 proceeds from step F102 to F103, where the format processing is ended assuming that the currently loaded multilayer recording medium 1 is an optical disc of which formatting is inhibited.

In the event of a blank disc, the drive control unit 101 proceeds to step F104 to perform physical format. Specifically, the drive control unit 101 instructs the controller 44 of the recorder/reproducer 10 to perform physical format of the multilayer recording medium 1. In the event that there is an error in this case, the drive control unit 101 proceeds from step F105 to F106, and takes this as a format error. Upon physical format being completed, in step F107 and thereafter, the drive control unit 101 actually performs the track setting processing. In step F107, the drive control unit 101 sets (reserves) the track TK#4 to be used for recording of an AVDP or RVDS (Reserve Volume Descriptor Sequence). As illustrated in FIG. 9B, the track TK#4 is set in the rear edge portion of the layer L5 at the front-most side in a 6-layer disc, for example.

Next, in step F108, the drive control unit 101 performs close processing of the track TK#4. This is processing for setting, in accordance with the UDF regulations, an AVDP area as the track TK#4, and also closing this, and thereafter recording the AVDP in an optional location by POW. Note that the AVDP in the UDF is a point for the host first reading out, and is information whereby all of the files in the optical disc may be accessed from here. With the UDF, the AVDP is stipulated so as to be recorded in two or more locations of the sector of the logical block number (LBN) 256, the last selector (Z), and of Z—256 sectors.

Next, in step F109, the drive control unit 101 sets the track TK#1 to the layer L0 as a management information track. Further, in step F110, the drive control unit 101 sets the track TK#2 to the layer L0 as a user data track. In this state, as illustrated in FIG. 9, areas of the tracks TK#1, TK#2, and TK#4 are determined. A section between the track TK#2 and the track TK#4 becomes the track TK#3 which is transiently a mirror track.

In step F111, the drive control unit 101 creates a UDF structure. In step F112, the drive control unit 101 performs control for recording an AVDP, an MVDS (Main Volume Descriptor Sequence), a file set descriptor, a metadata file FE, and a metadata mirror file FE in the track TK#1. Specifically, the drive control unit 101 instructs the controller 44 to record these management information in the track TK#1 in the multilayer recording medium 1. Note that, at this time, the controller 44 executes OPC (test write and laser power adjustment) using the OPC area in the layer L0, and then causes the recording/reproducing unit 50 and optical pickup OP to execute recording operation of the tracks TK#1 and TK#3.

In step F113, the drive control unit 101 confirms an error of the above-mentioned recording operation, and in the event that there is no error, in step F114 performs processing for recording the AVDP and RVDS in the track TK#4. That is to say, the drive control unit 101 instructs the controller 44 to perform recording for the track TK#4. However, in this case, the track TK#4 has already been closed, and accordingly, the AVDP and RVDS are here recorded in another area by POW on the recorder/reproducer 10 (controller 44) side. Next, in step F115, the drive control unit 101 confirms an error of the recording operation, and in the event that there is no error, in step F116, formatting has normally been completed. Note that, in the event that determination is made in step F113 or F115 that there is a write error, the processing is ended as formatting failure in step F117. Thus, the multilayer recording medium 1 is in the initial state in FIG. 9B.

4-3. Recording/Closing Track/Track Setting of Next Layer

As described in FIGS. 10 and 11, hereinafter, closing of a track or track setting for another layer is performed in accordance with progress of recording operation. Also, as described in FIGS. 12 and 13, in the event that NWA invalidation of all tracks in a layer has been performed by the controller 44, track setting of the next layer may be performed.

Description will be made regarding processing of the drive control unit 101 in the event that a recording command (file write request) has occurred at the host apparatus 100, including such track setting.

Figure 15:
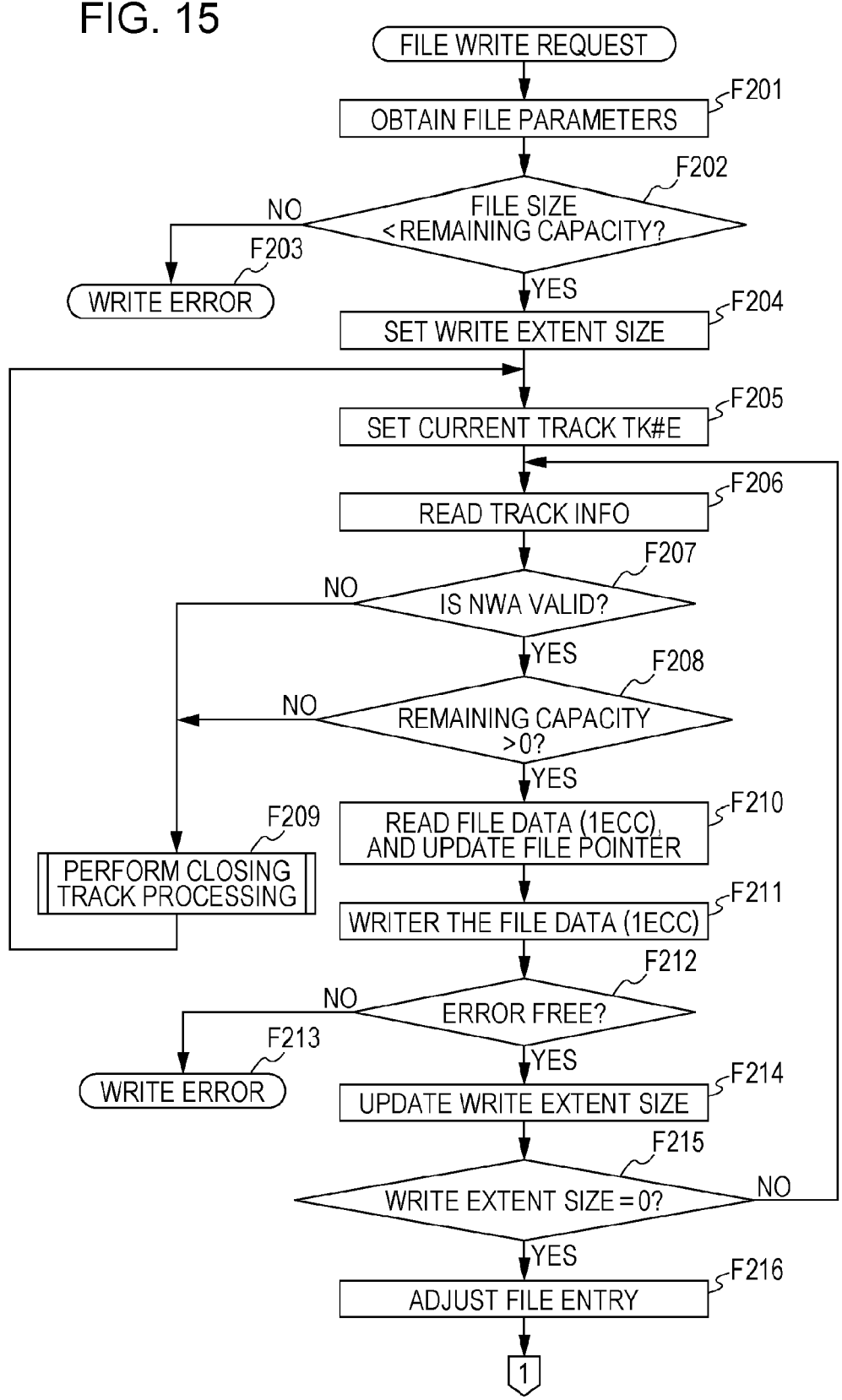
FIG. 15 is a flowchart of recording processing according to an embodiment.
Figure 16:
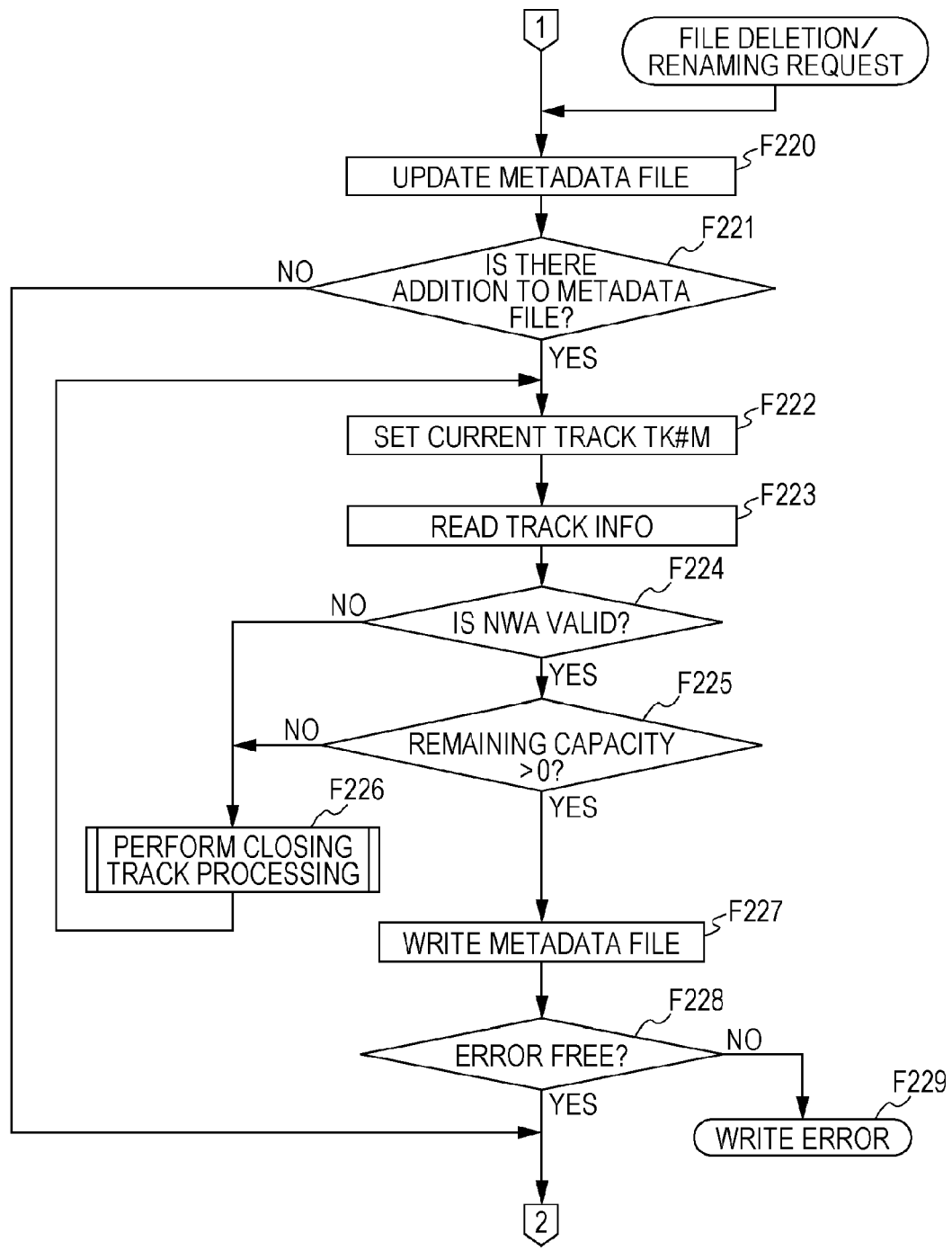
FIG. 16 is a flowchart of the recording processing according to an embodiment.
Figure 17:
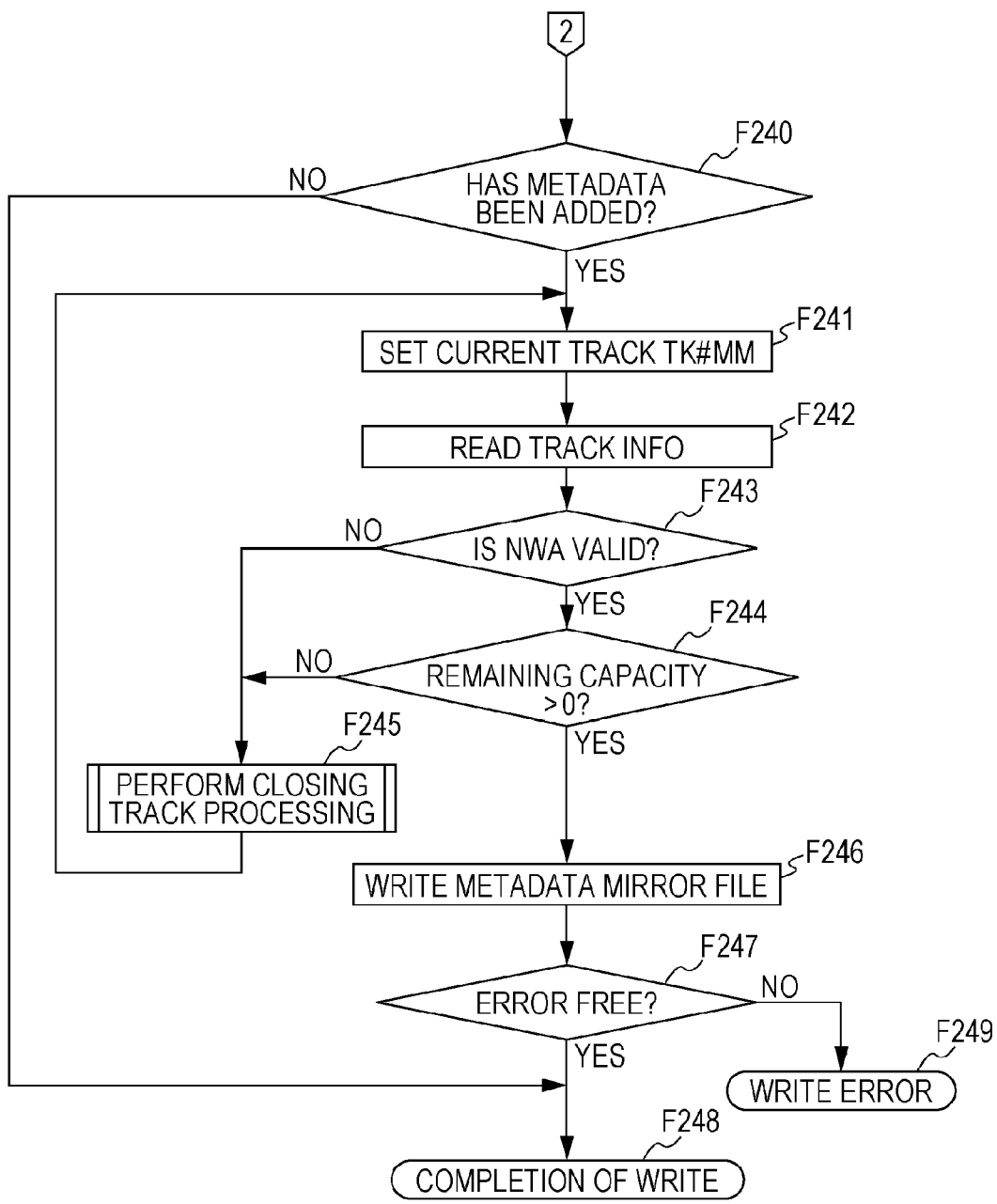
FIG. 17 is a flowchart of the recording processing according to an embodiment.

FIGS. 15, 16, and 17 illustrate processing of the drive control unit 101 in response to occurrence of a file write request command. Upon having received a file write request, in step F201 the drive control unit 101 obtains file parameters, and confirms the file size. Specifically, the drive control unit 101 determines whether or not a user data file requested this time is recordable for the remaining capacity of the multilayer recording medium 1. In the event the file size exceeds the remaining capacity, the drive control unit 101 proceeds from step F202 to F203, and takes this file size as a write error. In the event that the file size does not exceeds the remaining capacity, the drive control unit 101 proceeds from step F202 to F204, and sets a write extent size. Specifically, the drive control unit 101 sets the value of the file size as a write extent size (data size to be consecutively recorded).

Next, in step F205, the drive control unit 101 sets the current track TK#E. The current track TK#E is specified as a track where recording will be performed from now on. For example, in the event of the state in FIG. 9B, the track TK#2 is set as the current track TK#E.

In step F206, the drive control unit 101 reads track information from the management information track TK#1 (or from the contents of the management information track TK#1 already read), for example. In steps F207 and F208, the drive control unit 101 confirms regarding the current track TK#E (e.g., TK#2) whether or not the NWA is valid, or whether or not there is remaining capacity. The NWA is an address where sequential recording will be performed from now on, and in the event that the NWA is valid, recording has to be started from an address that the NWA thereof indicates. A case where the NWA is invalid is that the current track TK#E is in a state in which consecutive recording may not be performed for any reason. Of cause, as described above, this also include a case where the controller 44 has invalidated the NWA, such as a case where the OPC area in this layer has completely been used, a case where the controller 44 of the recorder/reproducer 10 has determined that this layer is a poor layer, and so forth. Also, with the current track TK#E thereof, in the event that the remaining capacity=0, recording may not be executed regarding the current track TK#E.

In the event that determination is made in steps F207 and F208 that the NWA is valid, and also, remaining capacity=0 does not hold, the drive control unit 101 proceeds to step F210, and performs recording processing of file data. Recording of file data is performed in increments of one ECC block, for example. Therefore, the drive control unit 101 reads out, for example, one ECC block worth of file data to be recorded in step F210 from the internal buffer or the like of the host apparatus 100, and supplies to the recording/reproducing unit 50 of the recorder/reproducer 10. Next, as step F211, the drive control unit 101 instructs (transmits a write command to) the controller 44 to cause the recording/reproducing unit 50 to execute recording operation of one ECC block worth of the file data. Note that in step F210 the drive control unit 101 also performs, in order to record the next ECC block worth, updating of a file pointer that indicates the next ECC block within file data to be recorded.

Note that, at the time of the write command in step F211, the controller 44 of the recorder/reproducer 10 executes OPC using the OPC area in the layer L0 as appropriate, and then causes the recording/reproducing unit 50 and optical pickup OP to execute the specified recording operation.

In general, OPC for the layers has to be performed once after the multilayer recording medium 1 is loaded in the recorder/reproducer 10. For example, with regard to the layer L0, in the event that OPC is first performed once after loading of a disc, and the optimal recording laser power is recognized, OPC does not have to be performed at the time of recording operation for the layer L0 thereafter.

In step F212, the drive control unit 101 confirms whether or not recording of this one ECC block worth has been executed without errors. In the event that an error has occurred, in step F213 the drive control unit 101 determines this recording to be a write error. In the event of error free, in step F214 the drive control unit 101 updates the write extent size. Specifically, the drive control unit 101 subtracts the size of one ECC block worth from the write extent size so that the write extent size indicates the remaining consecutive recording amount.

In step F215, the drive control unit 101 confirms whether or not the write extent size=0. As can be understood from the processing in step F214, the write extent size=0 indicates that recording of a user data file requested this time has been completed. Unless the write extent size=0, the drive control unit 101 proceeds to step F206 to confirm information of the current track TK#E. Specifically, the NWA and remaining capacity are confirmed, and in the event that these have no problem, the drive control unit 101 continuously perform recording processing of a user data file in increments of ECC blocks as steps F210 to F214.

In the event that confirmation is made in step F215 at a certain point-in-time that the write extent size=0, this means that recording of user data requested this time has been completed with the current track TK#E alone which has been set first (e.g., TK#2), and accordingly, the drive control unit 101 proceeds to updating of the management information (metadata and so forth) in step F216 and thereafter.

However, before recording of user data requested this time is completed, the current track TK#E may not be used any further. Specifically, examples of this case include a case where determination is made in step F207 that the NWA is invalid, and a case where determination is made in step F208 that the remaining capacity=0. In such a case, the drive control unit 101 performs the closing track processing in step F209.

Figure 18:
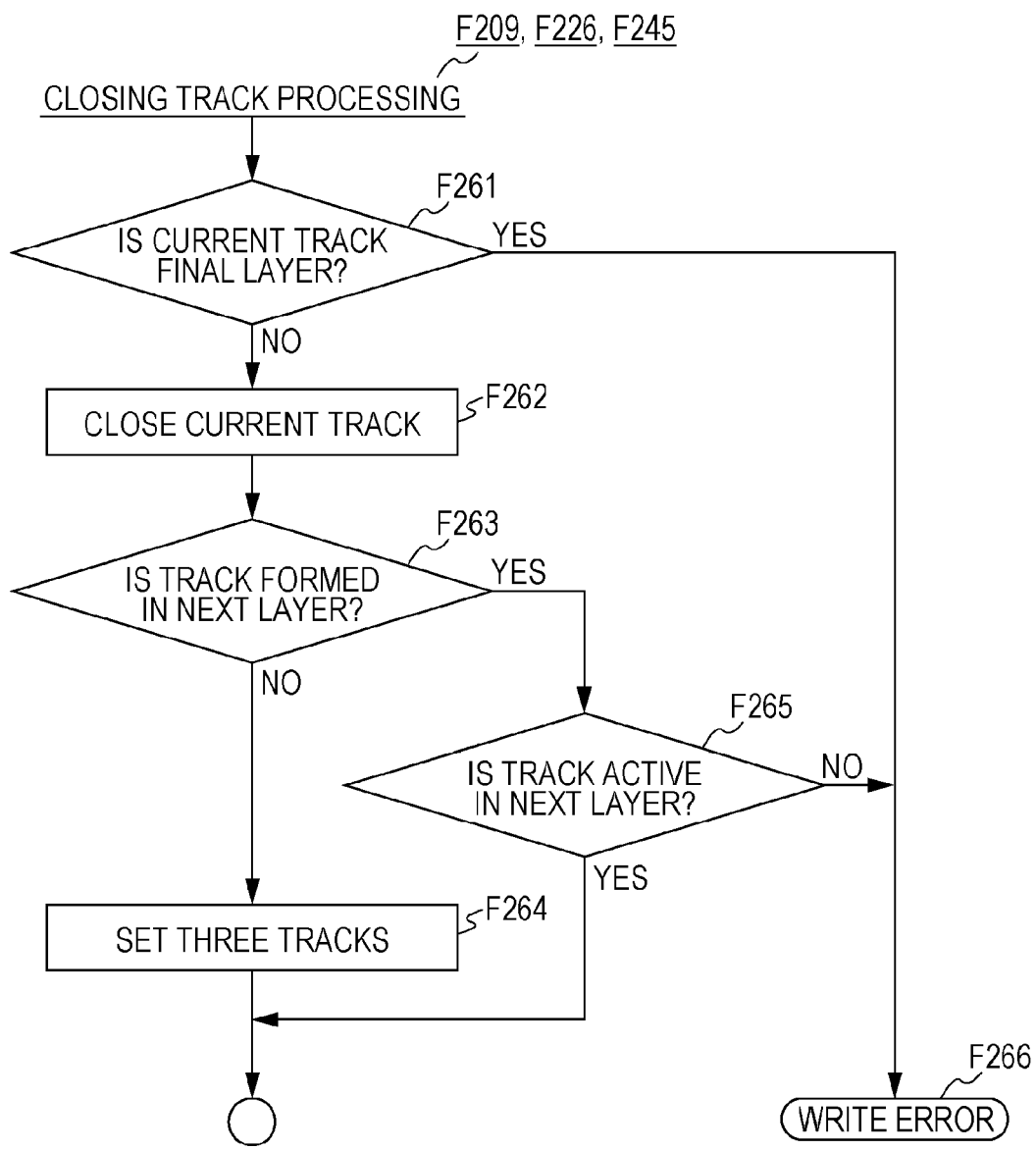
FIG. 18 is a flowchart of closing track processing according to an embodiment.

An example of the closing track processing is illustrated in FIG. 18. First, in step F261 the drive control unit 101 confirms whether or not the current track TK#E is a track of the final layer, that is, in the event of a 6-layer disc, the front-most layer L5. In the event that the current track TK#E is a user data track of the final layer, recording may not be performed any further, and accordingly, in step F266 the controller 44 takes this as a write error. In the event that the current track TK#E is not included in the final layer, the drive control unit 101 proceeds to step F262 to perform close processing on the current track TK#E. Next, in step F263, the drive control unit 101 confirms whether or not track setting (setting of a management information track, a user data track, and a mirror track) has already been performed on the next layer toward the front side. In the event that track setting has not been performed, the drive control unit 101 proceeds to step F264 to set three tracks (a management information track, a user data track, and a mirror track) to the next layer, and ends the processing in FIG. 18.

Note that at the point-in-time in step F263, track setting has already been performed on the next layer, track setting does not have to be performed here. In this case, in step F265 the drive control unit 101 confirms whether or not the same type of track (user data track in this case) in the next layer is active (=not closed), and in the event of active, ends the processing in FIG. 18. In the event of not active, in step F266 the drive control unit 101 takes this as a write error.

The above-mentioned processing is processing in the case illustrated in FIG. 10A or FIG. 10B, for example. Specifically, in the case of FIG. 10A, with a recording process of user data, the user data track TK#2 has completely been used, and accordingly, in step F264 three tracks TK#4, TK#5, and TK#6 are set to the layer L1.

Alternatively, as illustrated in FIG. 12A or 13A, an arrangement may be made wherein in the event that the controller 44 of the recorder/reproducer 10 has already performed NWA invalidation regarding the track TK#2, the processing proceeds to step F209 from step F207 in FIG. 15, and the processing in FIG. 18 is performed, and in step F264, the three tracks TK#4, TK#5, and TK#6 are set to the layer L1.

Note that a case where the tracks have already been set in the next layer in step F263 is, for example, as illustrated in FIG. 11A, a case where the management information track in the layer L2 has completely been used, track setting has been performed on the layer L3, and at a point-in-time thereafter, the user data track TK#8 in the layer L2 has completely been used, and the drive control unit 101 has proceeded to step F263. In this case, the user data track TK#11 has already been set to the next layer L3.

Now, processing of track setting for the next layer to be performed in step F264 will be described. At the time of track setting, this processing is processing for obtaining data capacity per one layer, and performing track division using the value thereof. The data capacity mentioned here means capacity of an area which may be used as a track. The track division mentioned here means, for example, with the state in FIG. 9B, that from a transient state in which the track TK#3 is set immediately before of the track TK#4 in the layer L5, this track TK#3 is divided, and as illustrated in FIG. 10A, tracks TK#4, TK#5, and TK#6 are set to the layer L1.

Figure 19A:
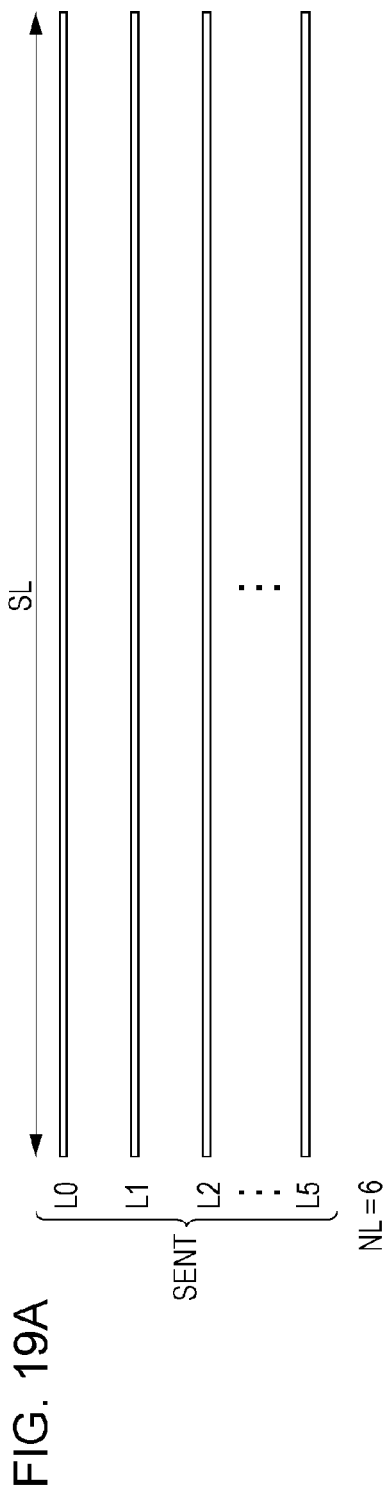
FIGS. 19A and 19B are explanatory diagrams of user data capacity acquisition per one layer according to an embodiment.
Figure 19B:
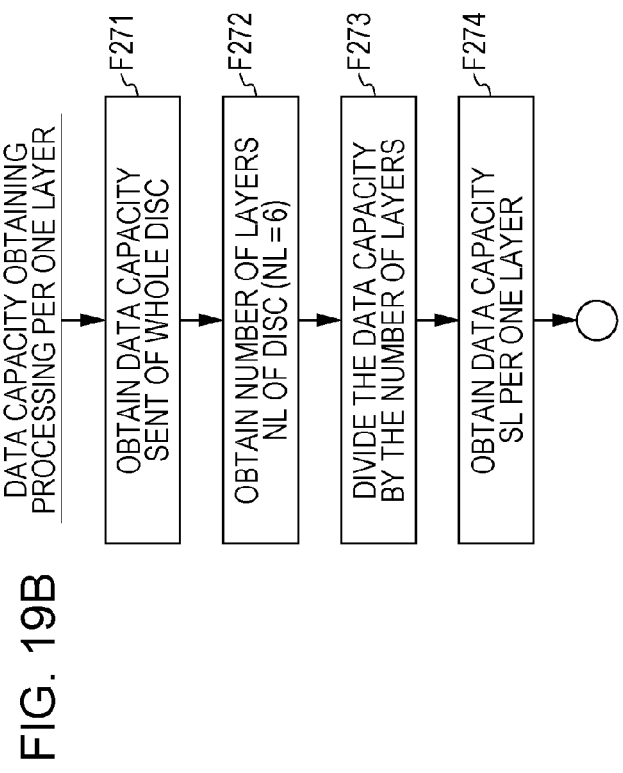

FIGS. 19A and 19B illustrate a technique for obtaining data capacity per one layer. As illustrated in FIG. 19A, let us say that the data capacity of the entire multilayer recording medium 1=SENT, the data capacity of one layer=SL, and the number of layers NL=6. FIG. 19B illustrates data capacity obtaining processing per one layer that the drive control unit 101 performs. In step F271, the drive control unit 101 obtains the data capacity SENT of the entire multilayer recording medium 1 from the controller 44. In step F272, the drive control unit 101 obtains the number of layers NL of the multilayer recording medium 1. The controller 44 may obtain these information from the management information of the multilayer recording medium 1. In step F273, the drive control unit 101 divides the data capacity SENT by the number of layers NL. Next, in step F274, the drive control unit 101 obtains the data capacity SL of one layer as a division result.

Figure 20A:
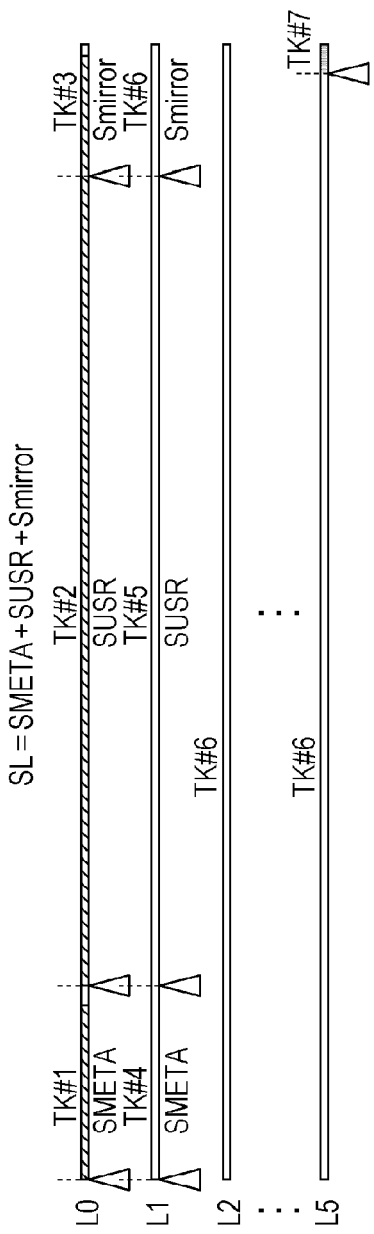
FIGS. 20A and 20B are explanatory diagrams of track division in increments of layers according to an embodiment.
Figure 20B:
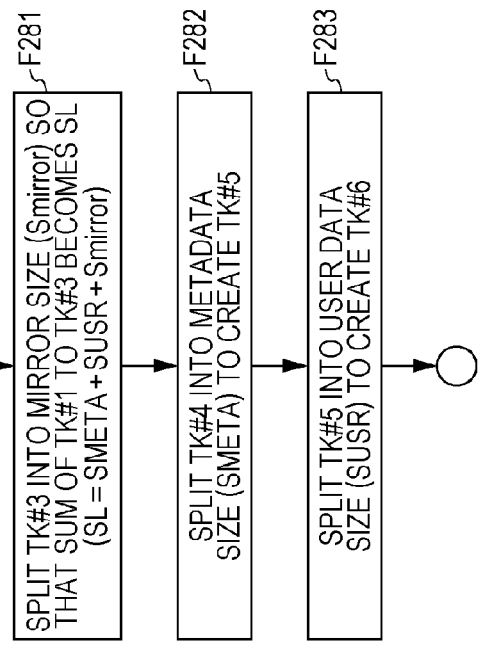

FIGS. 20A and 20B illustrate track division processing. As illustrated in FIG. 20A, for example, let us assume a case where at the time of the track TK#2 in the layer L0 being closed, the tracks TK#4, TK#5, and TK#6 are set to the layer L1. As illustrated in FIG. 20B, first, in step F281 the drive control unit 101 splits the track TK#3 so that summation of the capacities of the tracks TK#1, TK#2, and TK#3 is the data capacity SL of one layer. Specifically, the drive control unit 101 divides the mirror track TK#3 so as to satisfy SL=SMETA+SUSR+Smirror regarding capacity SMETA of a management information track TK#1, capacity SUSR of a user data track TK#2, and capacity Smirror of a mirror track TK#3. At this point-in-time, from the head and thereafter of the layer L2 becomes a track TK#4. Next, in step F282, the drive control unit 101 splits this track TK#4 with the capacity SMETA. Thus, the track TK#4 becomes a track having the same size as with the track TK#1 and also overlapped in the laser beam axial direction, and thereafter becomes a track TK#5. Next, in step F283, the drive control unit 101 splits this track TK#5 with the capacity SUSR. Thus, the track TK#5 becomes a track having the same size as with the track TK#2 and also overlapped in the laser beam axial direction, and thereafter becomes a track TK#6.

According to the above-mentioned processing, the tracks TK#4, TK#5, and TK#6 have been set to the layer L1. Note that a track which has been taken as the track TK#4 at first in layer L5 where recording of an AVDP is performed is postponed to become a track TK#7 in accordance with the above-mentioned track division. The case of the layer L1 has been described here, but in cases leading to FIGS. 10B, 11A, and 11B, and the cases illustrated in FIGS. 12B and 13B as well, similar track division processing will be performed, whereby tracks will be set.

Upon finishing the closing track processing (and track setting processing for the next layer) in FIG. 18, the drive control unit 101 returns to step F205 in FIG. 15 to set the current track TK#E. In this case, the user data track in the next layer which has newly been set (or has already been set) is taken as the current track TK#E. Next, recording of user data is similarly executed on the current track TK#E for each one ECC block worth by the processing in steps F206 to F214.

In this manner, even in the event that a user data track has been closed in a certain layer, recording of user data may continuously be executed using a user data track in the next layer in a consecutive manner, and accordingly, the area of each layer is effectively used.

Upon recording of user data requested this time being completed after the write extent size becomes 0 in step F215, the drive control unit 101 proceeds to step F216 to perform adjustment of a file entry according to recording of user data of this time. Next, the drive control unit 101 proceeds to step F220 in FIG. 16 to perform updating of the contents of a metadata file according to modification of a file entry or the like. In step F221, the drive control unit 101 determines whether or not additional writing onto the multilayer recording medium 1 of the metadata file has to be performed. For example, determination is made whether or not the contents of the metadata file has been changed, or whether or not this is actually timing for updating the metadata file on the multilayer recording medium 1, or the like. In the event that writing onto the multilayer recording medium 1 is not performed, the drive control unit 101 proceeds to FIG. 17.

In the event of writing the metadata file into the multilayer recording medium 1, the drive control unit 101 proceeds to step F222 to set the current track TK#M. The current track TK#M is specified as a track where recording of the management information (metadata file) is to be performed thereafter. For example, in the event of the state in FIG. 9B, the track TK#1 is set as the current track TK#M.

In step F223, the drive control unit 101 reads track information regarding the current track TK#M (e.g., management information track TK#1). In steps F224 and F225, confirmation is made regarding the current track TK#M whether or not the NWA is valid, and whether or not there is the remaining capacity.

Unless the NWA is valid, and also the remaining capacity=0, the drive control unit 101 proceeds to step F227 to perform recording processing of a metadata file to the current track TK#M. In step F228, the drive control unit 101 confirms whether or not recording of this metadata file has been executed without errors. In the event that an error has occurred, in step F229 the drive control unit 101 takes this recording as a write error. In the event of error free, the drive control unit 101 proceeds to processing in FIG. 17.

Here, determination may be made in step F224 that the NWA of the current track TK#M is invalid, or determination may be made in step F225 that the remaining capacity=0. In these cases, the drive control unit 101 performs closing track processing in step F226. The closing track processing is as described in FIG. 18. In this case, for example, in the event that the management information track TK#1 which is the current track TK#M has been closed, and track setting has not been performed on the next layer, three tracks (management information track, user data track, and mirror track) are set. In the event that the three tracks have already been set, track setting does not have to be performed. Next, the drive control unit 101 returns to step F222 in FIG. 16 to set the current track TK#M. In this case, a management information track (e.g., TK#4) in the next layer which has newly been set (or has already been set) is taken as the current track TK#M. Next, recording of the metadata file is executed on the current track TK#M by the processing in steps F223 to F228. In this manner, even when a management information track is closed in a certain layer, recording of the management information such a metadata file and so forth may continuously be executed using a management information track in the next layer in a consecutive manner.

Upon the processing regarding recording of a metadata file illustrated in FIG. 16 being completed, the drive control unit 101 proceeds to step F240 in FIG. 17. In the event that the above-mentioned addition of a metadata file has not been performed this time, the drive control unit 101 directly proceeds to step F248 to take this as completion of writing. In the event that recording of a metadata file which has been described in FIG. 16 has been performed, the drive control unit 101 subsequently performs writing of a metadata mirror file.

In the event of writing a metadata mirror file in the multilayer recording medium 1, the drive control unit 101 proceeds to step F241 to set the current track TK#MM. The current track TK#MM is specified as a track where recording of a metadata mirror file will be performed from now on. For example, in the event of the state in FIG. 9B, the track TK#3 is set as the current track TK#MM.

In step F242, the drive control unit 101 reads track information regarding the current track TK#MM (e.g., management information track TK#3). In steps F243 and F244, the drive control unit 101 confirms regarding the current track TK#MM whether or not the NWA is valid, and also whether or not there is the remaining capacity.

In the event that the NWA is valid, and also, remaining capacity=0 does not hold, the drive control unit 101 proceeds to step F246 to perform recording processing of a metadata mirror file to the current track TK#MM. In step F247, the drive control unit 101 confirms whether or not recording of this metadata mirror file has been executed without errors. In the event that an error has occurred, in step F249 the drive control unit 101 takes this writing as a write error. In the event of error free, the drive control unit 101 proceeds to step F248 to end a series of control procedures regarding writing of user data.

In the event that determination is made in step F243 that the NWA of the current track TK#M is invalid, or determination is made in step F244 that the remaining capacity=0, the drive control unit 101 performs closing track processing in step F245. The closing track processing is as described in FIG. 18. In this case, for example, in the event that the mirror track TK#3 which is the current track TK#MM has been closed, and track setting has not been performed on the next layer, three tracks (management information track, user data track, and mirror track) are set. In the event that the three tracks have already been set, track setting does not have to be performed. Next, the drive control unit 101 returns to step F241 in FIG. 17 to set the current track TK#MM. In this case, a mirror track (e.g., TK#6) in the next layer which has newly been set (or has already been set) is taken as the current track TK#MM. Next, recording of the metadata mirror file is executed on the current track TK#MM by the processing in steps F242 to F247. In this manner, even when a mirror track is closed in a certain layer, recording of a metadata mirror file may continuously be executed using a mirror track in the next layer in a consecutive manner.

Note that the above-mentioned processing is processing according to a write request for user data, but in the event that a request command such as file deletion, renaming (change in a file name), or the like has occurred, rewriting (additional writing) of a management information file or mirror file is performed instead of recording of user data. In this case, step F220 and thereafter in FIG. 16 will be executed. Accordingly, a management information track or mirror track may be consumed without recording of user data, and as exemplified in FIG. 11A, a management information track or mirror track may be completely used in a certain layer prior to a user data track. In such a case as well, in the same way as described above, closing track processing, and three-track setting processing for the next layer are performed.

4-4. Track Management in Increments of Layers Using Recorder/Reproducer

The controller 44 of the recorder/reproducer 10 performs recording control based on the above-mentioned control of the drive control unit 101.

Figure 21:
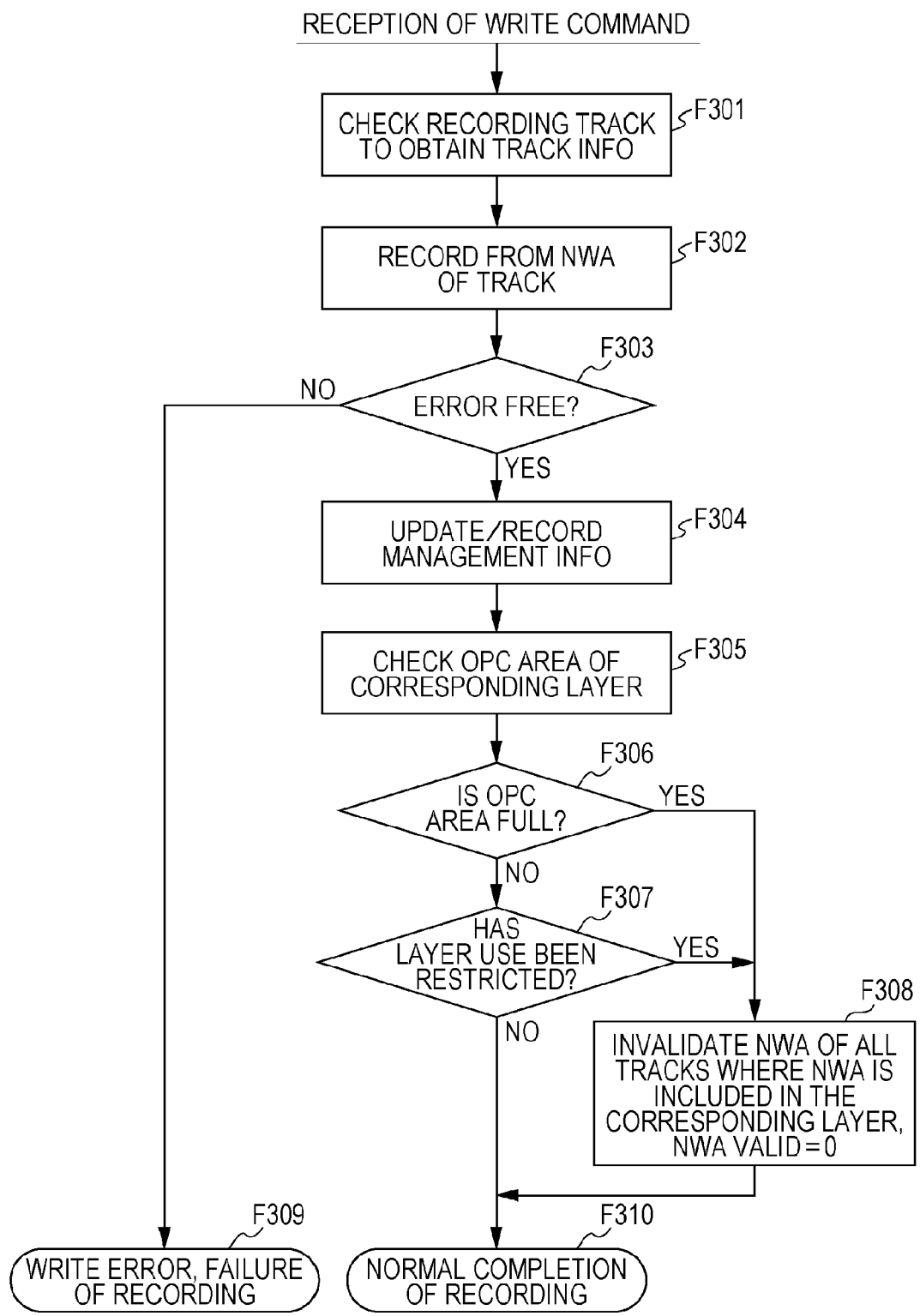
FIG. 21 is a flowchart of processing at the time of reception of a write command of a recorder/reproducer according to an embodiment.

In FIG. 21, description will be made regarding a processing example of the controller 44 in the event that recording request (reception of a write command) has been performed from the drive control unit 101.

Upon the write command from the drive control unit 101 being received, the controller 44 performs check of a recorded track and acquisition of track information in step F301 in FIG. 21.

Specifically, the controller 44 converts an LSN (Logical Sector Number: logical address) serving as the recording address specified with the write command into a PSN (Physical Sector Number: physical address). The controller 44 then confirms the corresponding track from the PSN to obtain track information.

For example, in the event of reception of the write command in step F211 in FIG. 15 by the drive control unit 101, the user data track TK#2 becomes the corresponding track, that is, a track where writing of data has been requested, for example.

Note that, at the time of performing recording control according to reception of the write command, the controller 44 may execute OPC. For example, with the first recording opportunity for a certain layer after the multilayer recording medium 1 is loaded, or the like, the optimal laser power is unknown, and accordingly, in such a case, OPC execution control is performed in the stage in step F301.

Next, in step F302, the controller 44 performs actual data recording control according to the write command. Specifically, the controller 44 causes the recording/reproducing unit 50 and optical pickup OP to execute recording of data from the NWA of the corresponding track.

Note that, actually, a write command may have a purpose for rewriting already recorded data. In this case, recording is executed with POW using sparing processing.

Also, in the event that a recording error has occurred during recording, the controller 44 may perform retry of recording with a predetermined number of times as an upper limit. Further, recording may be performed by performing sparing processing such as a case where recording may not be performed even when performing retry due to a defect on the disc.

In step F303, the controller 44 confirms an error, and in the event that there is an error, in step F309 ends the recording with a failure as a write error. The controller 44 informs the drive control unit 101 of completion with an error.

Note that the error to be confirmed in step F303 is a case where a write error has occurred even when performing retry or defect sparing at the recorder/reproducer 10. This may include retry on the file system side (drive control unit 101) in some situations.

In the event that there is no error in step F303, the controller 44 proceeds to step F304 to perform recording serving as updating or addition of management information according to this data recording.

In step F305, the controller 44 confirms the state of the OPC area in a layer where this recording has been performed. For example, in the event that recording for the track TK#2 has been performed, the controller 44 confirms whether or not the OPC area in the layer L0 has completely been used.

In the event that the OPC area is full, that is, has completely been used, the controller 44 proceeds from step F306 to F308.

Next, in step F308, the controller 44 performs NWA invalidation regarding all tracks where there is the NWA in the relevant layer. This is operation described in FIG. 12A, and in the event that after performing recording of user data for the track TK#2 this time, the OPC area in the layer L0 has completely been used, the NWA is invalidated regarding all of the tracks TK#1, TK#2, and TK#3 in the layer L0.

When reaching such a state, thereafter, in the event that the drive control unit 101 attempts to perform writing of data for any of the tracks TK#1, TK#2, and TK#3, NWA invalidation is detected in any of step F207 in FIG. 15, step F224 in FIG. 16, and step F243 in FIG. 17, track setting is performed on the next layer in closing track processing (processing in FIG. 18) in any of step F209 in FIG. 15, step F226 in FIG. 16, and step F245 in FIG. 17, and transition is made to the state illustrated in FIG. 12B.

Also, in the event that determination is made in the check in step F305 in FIG. 21 that there is a remaining area in the OPC area, the controller 44 proceeds to step F307 to determine whether or not layer use restriction has occurred.

For example, the following condition determination and so forth will be performed:

(a) In the event that at the time of this recording, sparing processing has occurred a predetermined number of times or more due to defects (b) In the event that at the time of this recording, a write error for proceeding to defect sparing processing has occurred a predetermined number of times or more, and in the event that the accumulated number of times of defect sparing processing in this layer has reached a predetermined number of times or more (c) In the event that the accumulated number of times of write errors for proceeding to defect sparing processing in this layer has reached a predetermined number of times Next, the controller 44 determines whether or not the quality of the target layer is in a recording disabled state.

In the event that determination is made that the quality of the target layer is in a recording disabled state, the controller 44 takes this as occurrence of layer use restriction, proceeds to step F308, and invalidates the NWA regarding all tracks in this layer.

This is equivalent to the processing described in FIG. 13A, for example. This state is the state illustrated in FIG. 13B by the processing of the drive control unit 101 performing track setting on the next layer.

Note that, with regard to the multilayer recording medium 1, restricting the number of layers to be recorded at the same time may be conceived. For example, in the event that OPC areas are overlapped in the layering direction, after OPC is performed on a layer on the front side, OPC may not be performed on a layer on the rear side thereof.

On the other hand, for example, with three consecutive layers, in the event of performing setting so that the OPC areas are not overlapped, even when OPC is performed on a layer on the front side, the OPC of a layer on the rear side and recording are not influenced. Accordingly, for example, in the event that the layout of the OPC areas is devised so that the OPC areas are not overlapped in the consecutive three layers, the three layers may be set to recording targets.

For example, with the layers L0, L1, and L2, the OPC areas differ in the radial positions thereof. The OPC area in the layer L3 is set to the same radial position as with the layer L0. The OPC area in the layer L4 is set to the same radial position as with the layer L1. The OPC area in the layer L5 is set to the same radial position as with the layer L2. Thus, as the consecutive three layers thereof, in any case of [L0, L1, L2], [L1, L2, L3], [L2, L3, L4], and [L3, L4, L5], the OPC areas are not overlapped.

In such a case, there may conceived an arrangement wherein layers to be recorded at the same time are restricted to three layers of six layers, for example. For example, first, the layers [L0, L1, L2] is taken as the targets, and when recording reaches the layer L3, track setting is performed on the layer L3, and the recording targets are set to the layers L1 to L3. In such a case, determination in step F307 may be processing wherein when recording reaches the layer L3, the layer L0 is hereinafter determined to be in a recording disabled state.

In the event of having performed the processing in step F308, after completion of the processing thereof, in step F310 the controller 44 ends recording with normal completion.

Also, in the event of corresponding to neither of the determinations in steps F306 and F307, in step F310 the controller 44 ends recording with normal completion without performing the processing in step F308.

For example, the above-mentioned processing is performed as a specific processing example, and accordingly, the above-mentioned advantage is realized. That is to say, the recording area (capacity) of the multilayer recording medium 1 may effectively be used by setting to recording disable in increments of layers while maintaining reliability.

4-5. Other Track Management Example Using Recorder/Reproducer

With the above-mentioned description, the controller 44 invalidates the NWAs of all tracks in a layer determined to be in a recording disabled state due to a case where the OPC area has completely been used or a poor layer or the like, thereby allowing the host apparatus 100 to recognize that all the tracks in this layer are in a recording disabled state.

There may variously be conceived other than NWA invalidation as the processing of the controller 44 to obtain the same advantage. Specifically, the processing in step F308 in FIG. 21 may be changed to the following examples. Alternatively, NWA invalidation and multiple processes of the following examples may be performed.

For example, the controller 44 may change the statuses of all tracks in a layer determined to be in a recording disabled state to a closed state, thereby allowing the host apparatus 100 (drive control unit 101) to recognize that all the tracks in this layer are in a recording disabled state.

The controller 44 changes a track to a closed status, and accordingly, this track is write-inhibited, and the NWA of the track thereof is also invalidated. Accordingly, the same operation as described above is performed, and track setting for the next layer is also performed by the drive control unit 101.

Also, the controller 44 may set unrecorded area size information of all tracks in a layer determined to be in a recording disabled state to zero, thereby allowing the host apparatus 100 (drive control unit 101) to recognize that all the tracks in this layer are in a recording disabled state. Specifically, information of a free size of track information is set to "0".

In this case, the drive control unit 101 determines in step F208 in FIG. 15 that the remaining amount=0, and performs the closing track processing in step F209 (and the track setting of the next layer), for example.

Also, the controller 44 may set the last written address information (LRA: Last Recorded Address) of all tracks in a layer determined to be in a recording disabled state to the value of a track termination address, thereby allowing the host apparatus 100 (drive control unit 101) to recognize that all the tracks in this layer are in a recording disabled state.

The LRA is set to the track termination address, which is the same as with the free size being zero. Accordingly, the above-mentioned same operation is performed, and track setting for the next layer is also performed by the drive control unit 101.

5. Modifications

Though the embodiment has been described so far, various modifications and applications may be conceived regarding the present disclosed technology.

With the embodiment, as processing of the controller 44 in FIG. 21, when the remaining amount of the OPC area becomes zero, according to a technique such as NWA invalidation, the host apparatus are allowed to recognize that all the tracks in this layer are in a recording disabled state, but this processing may not necessarily be performed immediately after recording. As described above, recording may be performed without performing OPC.

For example, an arrangement may also be made wherein after the multilayer recording medium 1 is loaded in the recorder/reproducer 10, laser power is set by performing OPC on the layer L0, the laser power is used until the multilayer recording medium 1 is ejected.

With this sense, even in the event that the OPC of a certain layer has completely been used, NWA invalidation may not be performed so as to perform recording of the layer thereof without performing OPC until the recording medium 1 is ejected.

Specifically, the processing in steps F305→F306→F308 in FIG. 21 may be performed at the time of the multilayer recording medium 1 being ejected instead of immediately after recording at each time.

With the embodiment, though three tracks according to a recording purpose have been set to one layer, two or four or more tracks may be set depending on an employed file system, management information format, or the like.

Also, with the embodiment, though description has been made assuming that the drive control unit 101 performs the processing examples in FIGS. 15 to 20, these processes are realized as a program for controlling a central processing unit in the host apparatus 100. For example, these processes may be realized by software serving as a device driver for the recorder/reproducer 10. Also, the controller 44 of the recorder/reproducer 10 may perform the track setting processing and closing track processing instead of the host apparatus 100 side. In this case, the controller 44 (central processing unit) has to operate based on a program serving as firmware causing the controller 44.

Such a program may be recorded in an HDD serving as a recording medium housed in a device such as a computer device or the like, ROM within a microcomputer including a CPU, or the like beforehand. Alternatively, such a program may temporarily or eternally be stored (recorded) in a removable recording medium such as a flexible disk, CD-ROM (Compact Disc Read Only Memory), an MO (Magnet optical) disk, DVD, Blu-ray Disc (registered trademark), a magnetic disk, semiconductor memory, a memory card, or the like. Such a removable recording medium may be provided as so-called package software. Also, such a program may not only be installed into a personal computer or the like from a removable recording medium but also be downloaded from a download site via a network such as a LAN (Local Area Network), the Internet, or the like.

Also, the multilayer recording medium 1 and recorder/reproducer 10 according to the embodiment are just an example. The configuration of the multilayer recording medium 1 and the configuration of the recorder/reproducer 10 may variously be conceived. Also, the multilayer recording medium 1 serving as an optical disc has been illustrated as an example, but a recording medium to which the present disclosed technology may be applied is not restricted to a optical-disc-shaped recording medium. For example, the present disclosed technology may also be applied to a card-shaped recording medium, or a recording apparatus corresponding thereto.

Note that the present technology may assume the following configurations.

(1) A recording apparatus including: a recording unit configured to perform recording of information on a recoding medium having a plurality of layers serving as recording layers where recording of information is performed, and a track serving as a continuous recording area is formed in the plurality of layers and recording of data is performed within a track; and a control unit configured to cause the recording unit to execute recording to the recording medium according to a request from a host apparatus, and also to enable the host apparatus to recognize, in the event of determining that a certain layer of the recording medium is in a recording disabled state, that all of tracks in this layer are in a recording disabled state.

(2) The recording apparatus according to (1), wherein the control unit determines, in the event that a test write area for adjustment of recording laser power has completely been used regarding a certain layer, that the layer thereof is in a recoding disabled state.

(3) The recording apparatus according to (1) or (2), wherein the control unit sets the next recording address to an invalid state regarding all of tracks in a layer determined to be in a recording disabled state, thereby enabling the host apparatus to recognize that all of tracks in this layer are in a recording disabled state.

(4) The recording apparatus according to any of (1) to (3), wherein the control unit changes the statuses of all of tracks in a layer determined to be in a recording disabled state to a closed state, thereby enabling the host apparatus to recognize that all of tracks in this layer are in a recording disabled state.

(5) The recording apparatus according to any of (1) to (4), wherein the control unit sets unrecorded area size information of all of tracks in a layer determined to be in a recording disabled state to zero, thereby enabling the host apparatus to recognize that all of tracks in this layer are in a recording disabled state.

(6) The recording apparatus according to any of (1) to (5), wherein the control unit sets last written address information of all of tracks in a layer determined to be in a recording disabled state to the value of a track termination address, thereby enabling the host apparatus to recognize that all of tracks in this layer are in a recording disabled state.

(7) The recording apparatus according to any of (1) to (6), wherein at least a management information track of which the recording purpose is to record management information, a user data track of which the recording purpose is to record user data, and a mirror track of which the recording purpose is to record mirror data of the management information are set to each layer of the recording medium; and wherein the control unit enables the host apparatus to recognize that all of tracks including the management information track, the user data track, and the mirror track in a layer determined to be in a recording disabled state are in a recording disabled state.

(8) The recording apparatus according to any of (1) to (7), wherein the control unit determines whether or not, based on a recording error at the time of recording or a situation of sparing processing regarding a certain layer, the layer thereof is in a recording disabled state.

The present disclosure contains subject matter related to that disclosed in Japanese Priority Patent Application JP 2012-144867 filed in the Japan Patent Office on Jun. 28, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a recording unit configured to perform recording of information on a recording medium having a plurality of layers serving as recording layers where recording of information is performed, and a track serving as a continuous recording area is formed in the plurality of layers and recording of data is performed within a track; and
a control unit configured to cause the recording unit to execute recording to the recording medium according to a request from a host apparatus, and also to enable the host apparatus to recognize, in the event of determining that a certain layer of the recording medium is in a recording disabled state, that all of tracks in this layer are in a recording disabled state,
wherein the control unit sets unrecorded area size information of all of tracks in a layer determined to be in the recording disabled state to zero, thereby enabling the host apparatus to recognize that all of the tracks in this layer are in the recording disabled state.

2. The recording apparatus according to claim 1, wherein the control unit determines, in the event that a test write area for adjustment of recording laser power has completely been used regarding the certain layer, that the certain layer thereof is in the recording disabled state.

3. The recording apparatus according to claim 1, wherein the control unit sets next recording address to an invalid state regarding all of the tracks in the certain layer determined to be in the recording disabled state, thereby enabling the host apparatus to recognize that all of the tracks in the certain layer are in the recording disabled state.

4. The recording apparatus according to claim 1, wherein the control unit changes the statuses of all of the tracks in the certain layer determined to be in the recording disabled state to a closed state, thereby enabling the host apparatus to recognize that all of the tracks in the certain layer are in the recording disabled state.

5. The recording apparatus according to claim 1, wherein the control unit sets last written address information of all of the tracks in the certain layer determined to be in the recording disabled state to a value of a track termination address, thereby enabling the host apparatus to recognize that all of the tracks in the certain layer are in the recording disabled state.

6. The recording apparatus according to claim 1, wherein at least a management information track of which the recording purpose is to record management information, a user data track of which the recording purpose is to record user data, and a mirror track of which the recording purpose is to record mirror data of the management information are set to each layer of the recording medium, and wherein the control unit enables the host apparatus to recognize that all of the tracks including the management information track, the user data track, and the mirror track in the certain layer determined to be in the recording disabled state are in the recording disabled state.

7. The recording apparatus according to claim 1, wherein the control unit determines whether or not, based on a recording error at the time of recording or a situation of sparing processing regarding the certain layer, the layer thereof is in the recording disabled state.

8. A recording method comprising:
recording information on a recording medium comprising a plurality of layers serving as recording layers to record information, and a plurality of tracks serving as continuous recording area formed in each of the plurality of layers, wherein the information is recorded within the plurality of tracks in response to a request from a host apparatus; and
recognizing, in the event of determining that one or more layers of the plurality of layers are in a recording disabled state, that each of the plurality of tracks in the determined one or more layers are in the recording disabled state,
wherein when unrecorded area size information of each of the plurality of tracks in the one or more layers is set to zero, each of the plurality of tracks in the one or more layers is recognized to be in the recording disable state.

9. The recording method of claim 8, wherein the plurality of tracks formed in each of the plurality of layers comprises a management information track to record management information, a user data track to record user data, and a mirror track to record mirror data of the management information.

10. The method of claim 9, wherein when the one or more plurality of layers are determined to be in the recording disabled state, each of the management information track, the user data track, and the mirror track of the one or more plurality of layers is recognized to be in the recording disabled state.

11. The recording method of claim 8, wherein when test write area for adjustment of recording laser power associated with each of the one or more layers has completely been used, the one or more layers are determined to be in the recording disabled state.

12. The recording method of claim 8, wherein when next recording address of each of the plurality of tracks in the one or more layers is set to an invalid state, each of the plurality of tracks in the one or more layers is recognized to be in the recording disable state.

13. The recording method of claim 8, wherein when status of each of the plurality of tracks in the one or more layers is set to a closed state, each of the plurality of tracks in the one or more layers is recognized to be in the recording disable state.

14. The recording method of claim 8, wherein when last written address of each of the plurality of tracks in the one or more layers is set to a value of a track termination address, each of the plurality of tracks in the one or more layers is recognized to be in the recording disable state.

15. The recording method of claim 8, wherein the one or more layers are recognized to be in the recording disable state based on a recording error associated with the one or more layers at the time of recording.

16. The recording method of claim 8, wherein the one or more layers are recognized to be in the recording disable state based on a situation of sparing processing associated with the one or more layers at the time of recording.

17. A non-transitory computer readable storage medium having stored thereon, a computer program having at least one code section executable by a computer, thereby causing the computer to perform the steps comprising:
recording information on a recording medium, wherein the recording medium comprises a plurality of layers to record the information, wherein each of the plurality of layers comprises a plurality of tracks serving as continuous recording area, and wherein the information is recorded within the plurality of tracks in response to a request from the computer;
determining one or more layers of the plurality of layers that are in a recording disable state; and
recognizing whether each of the plurality of tracks associated with each of the determined one or more layers are in the recording disable state,
wherein when unrecorded area size information of each of the plurality of tracks in the one or more layers is set to zero, each of the plurality of tracks in the one or more layers is recognized to be in the recording disable state.

* * * * *